(12) United States Patent
Hunt

(10) Patent No.: US 7,204,060 B2
(45) Date of Patent: Apr. 17, 2007

(54) SYSTEM FOR MANUFACTURING STRUCTURES OF CEMENTITIOUS MATERIALS

(76) Inventor: Christopher M. Hunt, 1920 Anastasia La., Atlanta, GA (US) 30341-1701

( * ) Notice: Subject to any disclaimer, the term of this patent is extended or adjusted under 35 U.S.C. 154(b) by 532 days.

(21) Appl. No.: 10/201,035

(22) Filed: Jul. 23, 2002

(65) Prior Publication Data

US 2002/0174606 A1 Nov. 28, 2002
US 2007/0056223 A9 Nov. 28, 2002

Related U.S. Application Data

(63) Continuation-in-part of application No. 09/784,848, filed on Feb. 16, 2001, now abandoned, and a continuation-in-part of application No. 09/741,787, filed on Dec. 21, 2000, now abandoned.

(51) Int. Cl.
*E04G 21/00* (2006.01)
*E04B 1/04* (2006.01)

(52) U.S. Cl. .............. 52/284; 52/270; 52/596; 52/745.08; 52/91.1; 52/189; 264/333

(58) Field of Classification Search ........... 52/270, 52/284, 596, 745.05, 745.08, 91.1, 91.2, 52/204.1, 183, 189; 264/333, 138, 163, 42
See application file for complete search history.

(56) References Cited

U.S. PATENT DOCUMENTS

| 1,079,152 | A | * | 11/1913 | Stentzel | 52/91.2 |
|---|---|---|---|---|---|
| 1,261,125 | A | * | 4/1918 | Havens | 52/11 |
| 1,432,222 | A | * | 10/1922 | Vail | 52/592.5 |
| 2,105,854 | A | * | 1/1938 | Buck | 52/91.2 |
| 2,184,714 | A | * | 12/1939 | Freeman | 52/250 |
| 3,076,293 | A | * | 2/1963 | Baudoux | 52/204.1 |
| 3,093,218 | A | * | 6/1963 | Peterson | 52/241 |
| 3,305,982 | A | * | 2/1967 | Steele | 52/90.1 |
| 3,529,389 | A | * | 9/1970 | Wilkins | 174/48 |
| 3,535,841 | A | * | 10/1970 | Nagy et al. | 52/236.6 |
| 3,875,710 | A | * | 4/1975 | Dawson et al. | 52/236.7 |
| 3,950,902 | A | * | 4/1976 | Stout | 52/91.2 |
| 4,196,161 | A | * | 4/1980 | Toffolon et al. | 264/71 |
| 4,231,199 | A | * | 11/1980 | Gomez et al. | 52/91.2 |
| 4,856,238 | A | * | 8/1989 | Kesting | 52/220.2 |
| 5,286,427 | A | * | 2/1994 | Koumal | 264/40.1 |
| 5,402,610 | A | * | 4/1995 | Salva' et al. | 52/182 |
| 5,589,124 | A | * | 12/1996 | Woolford et al. | 264/157 |
| 5,614,009 | A | * | 3/1997 | Kobayashi et al. | 106/38.2 |
| 5,939,104 | A | * | 8/1999 | Johnston | 425/356 |
| 5,987,827 | A | * | 11/1999 | Lord | 52/274 |
| 2002/0046521 | A1 | * | 4/2002 | Steinacker, Sr. | 52/274 |
| 2002/0178669 | A1 | * | 12/2002 | Harambasic et al. | 52/264 |
| 2003/0067096 | A1 | * | 4/2003 | Jurik | 264/333 |

FOREIGN PATENT DOCUMENTS

DE 3221407 C1 * 1/1984

* cited by examiner

*Primary Examiner*—Brian E. Glessner
(74) *Attorney, Agent, or Firm*—Robert M. Hunter

(57) ABSTRACT

This disclosure is a system which includes processes, machines, articles of manufacture and compositions of matter required to construct a habitable structure comprised of a cementitious product, preferably autoclaved aerated concrete ("AAC"), formed in unique blocks, panels and beams. This results in an extremely environmentally friendly habitable dwelling, residential or commercial, which, due to the resultant synergy of embodiments, when compared to a similar structure employing prior art and/or current industry's standard materials and methods of construction, is structurally superior and simultaneously yields substantial savings in labor, time and costs.

40 Claims, 18 Drawing Sheets

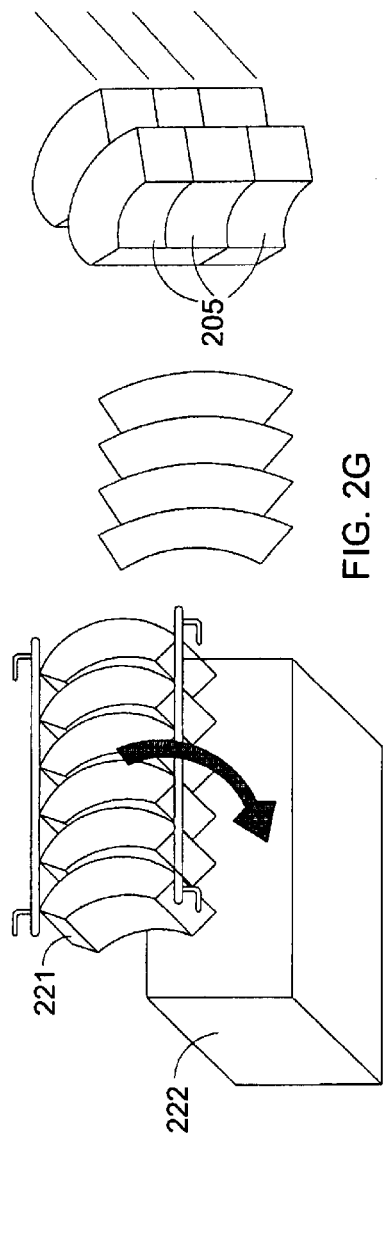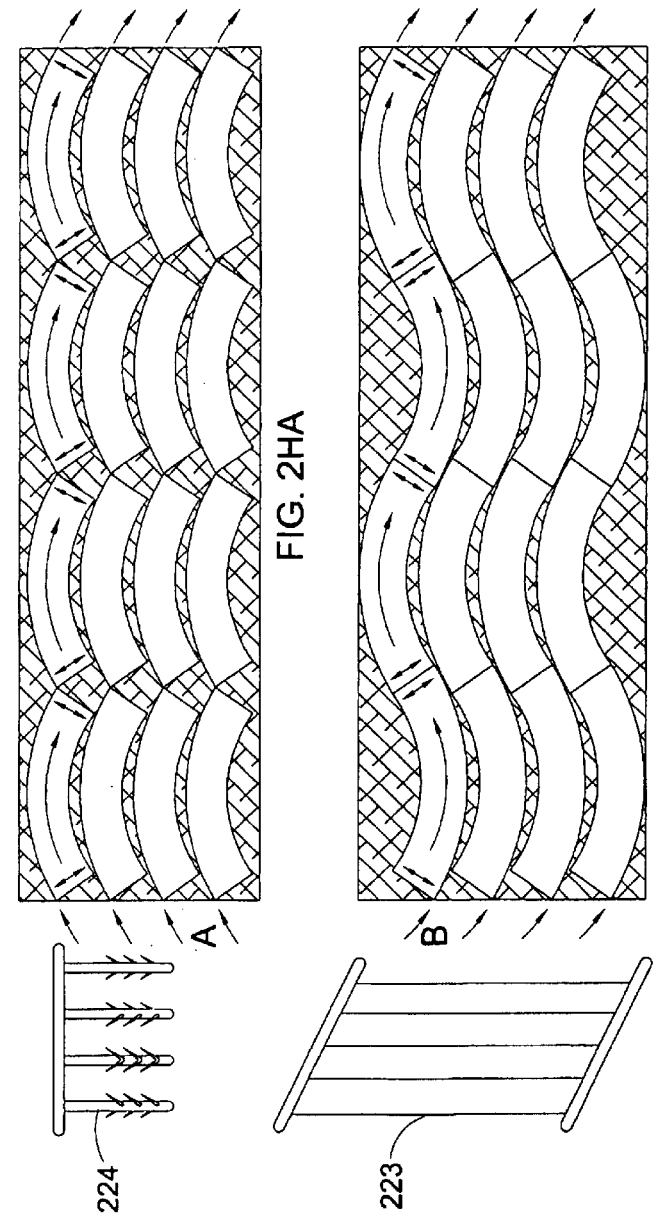
FIG. 2G
FIG. 2HA
FIG. 2HB

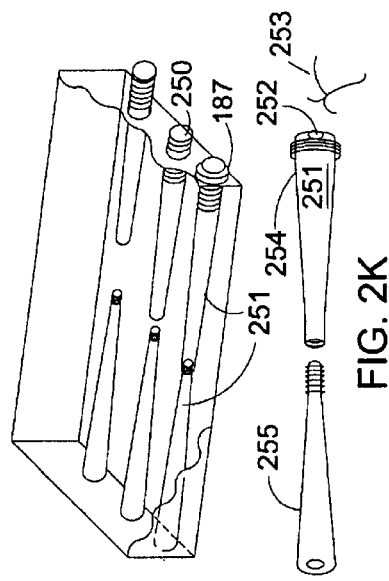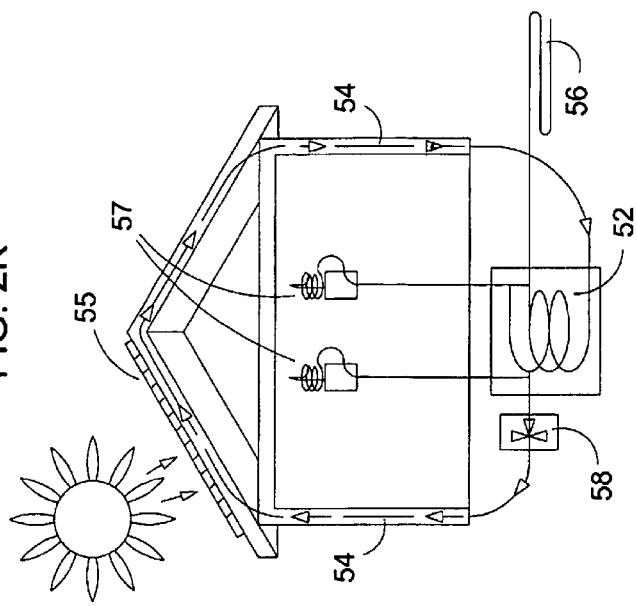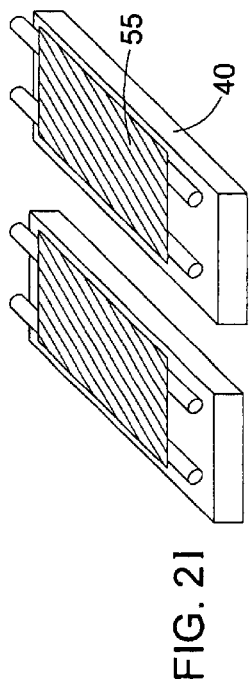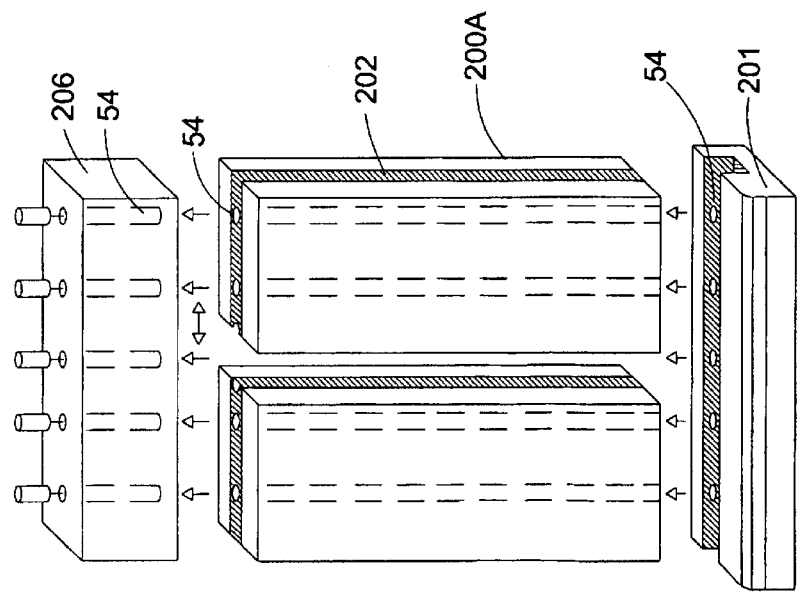

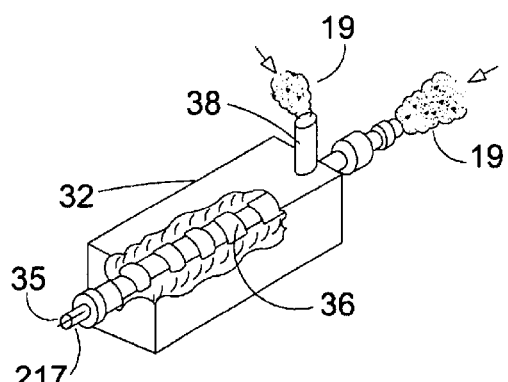
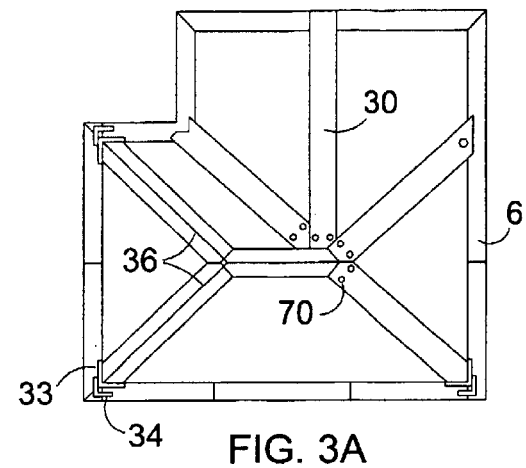
FIG. 3F
FIG. 3A
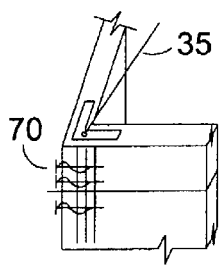
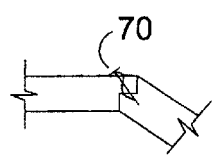
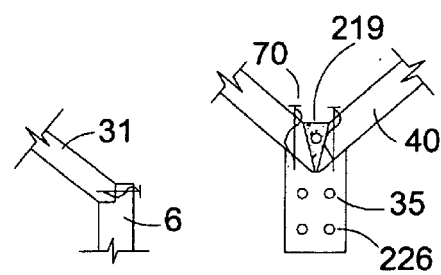
FIG. 3B  FIG. 3C  FIG. 3D  FIG. 3E
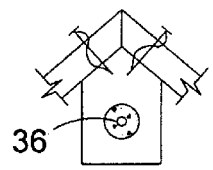
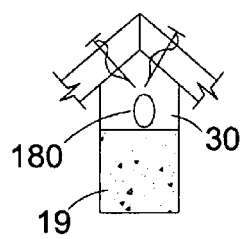
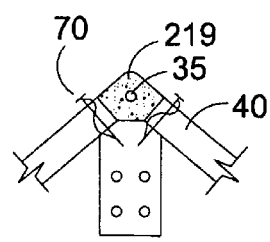
FIG. 3G  FIG. 3H  FIG. 3I

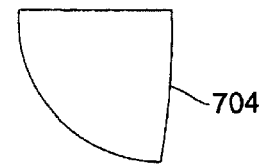
FIG. 7CCC
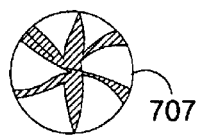
FIG. 7BB
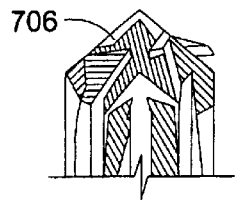
FIG. 7CC
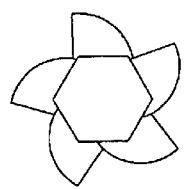
FIG. 7BBB
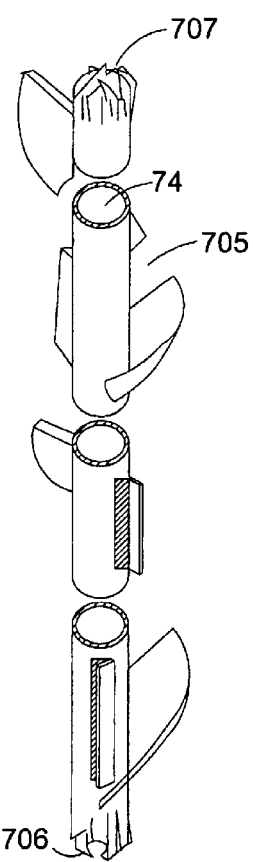
FIG. 7AA
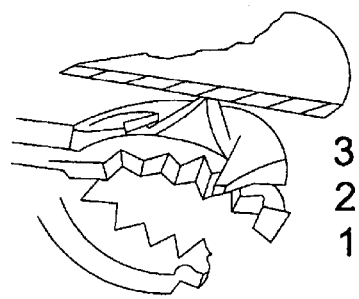
FIG. 7DD
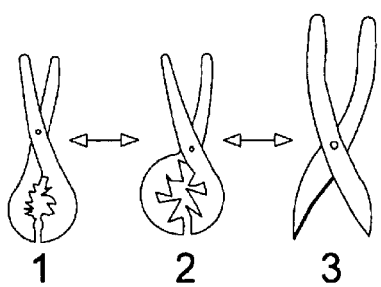
FIG. 7EE
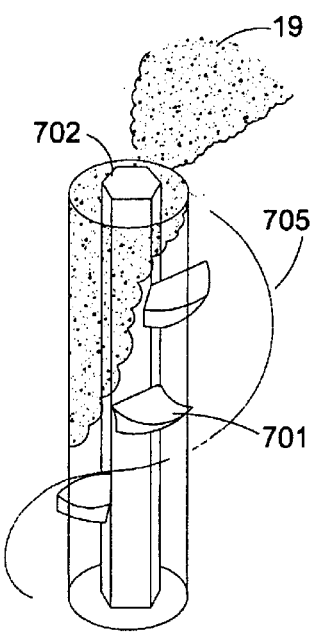
FIG. 7AAA

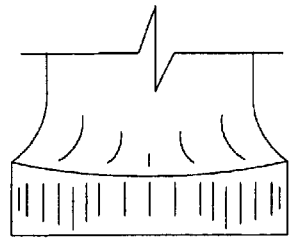
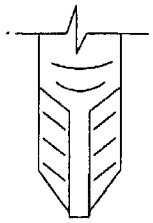
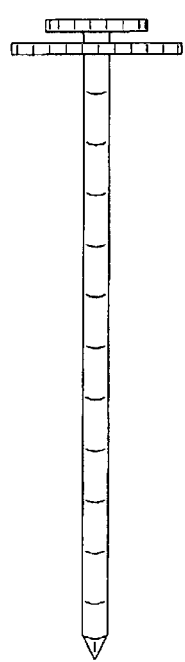
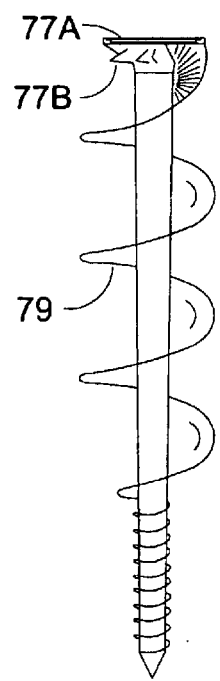
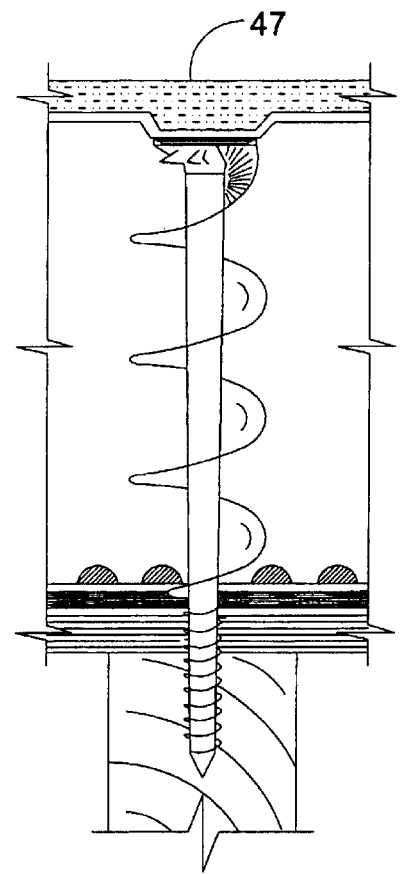
FIG. 7EEE
PRIOR ART
FIG. 7E
FIG. 7F

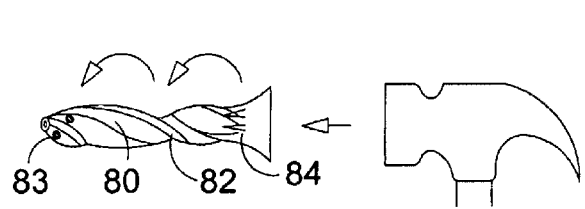
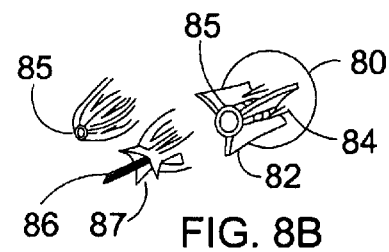
FIG. 8A     FIG. 8B
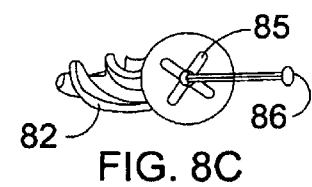
FIG. 8D     FIG. 8C
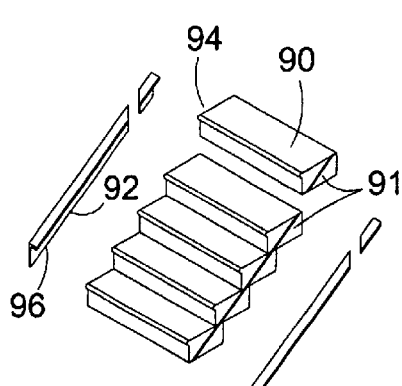
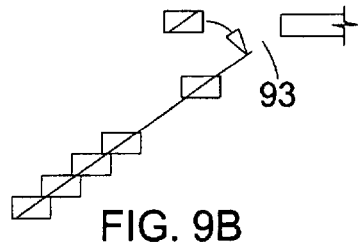
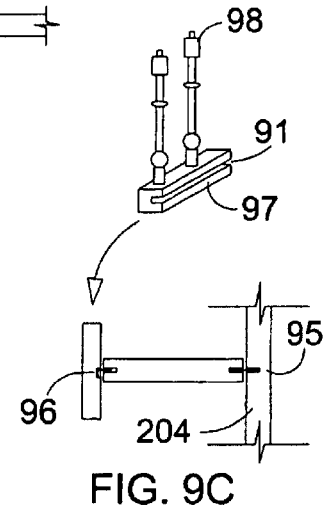
FIG. 9A     FIG. 9B     FIG. 9C
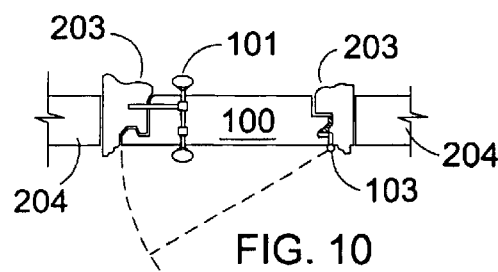
FIG. 10

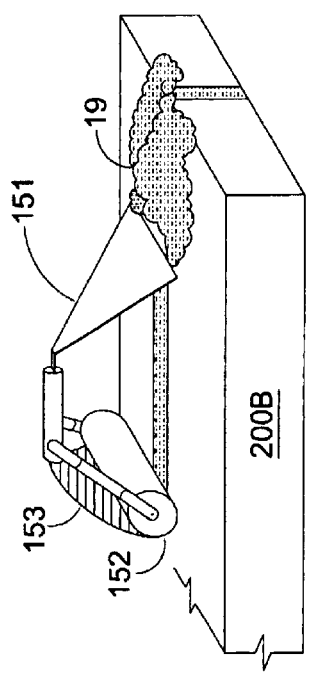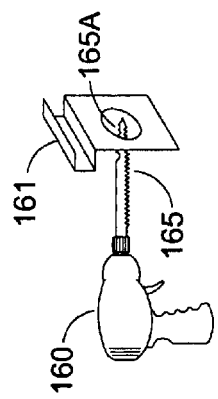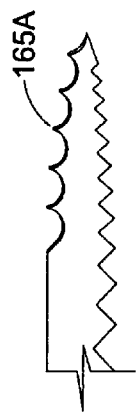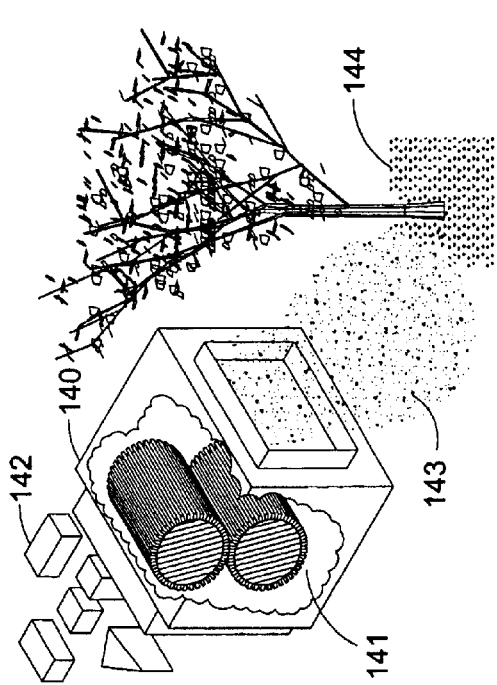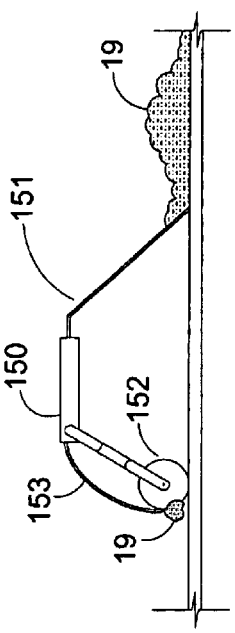

SYSTEM FOR MANUFACTURING STRUCTURES OF CEMENTITIOUS MATERIALS

RELATED APPLICATIONS

This application is a continuation-in-part of U.S. Nonprovisional application Ser. No. 09/784,848, filed Feb. 16, 2001 now abandoned, which claims the benefit of U.S. Provisional Pat. application No. 60/183,472, filed Feb. 18, 2000, now abandoned, and is a continuation-in part of U.S. Nonprovisional Patent application No. 09/741,787 filed Dec. 21, 2000, non abandoned,;the disclosures of which nonprovisional applications are incorporated by reference as if fully set forthe herein.

FIELD OF THE INVENTION

This invention is directed to the field of manufacturing and building structures, such as dwellings, and more particularly to a system for manufacturing structures of cementitious materials of an autoclaved aerated cementitious concrete.

BACKGROUND OF THE INVENTION

This invention relates to a system for manufacturing structures of cementitious materials, and to unique techniques for finishing various features of the structures. The construction industry is basically unchanged in materials and processes for hundreds of years, while during this same time most other industries have been revolutionized. The consequence is that there is vast room, and need, for improvement in the construction industry, for the lack of improvement has resulted in escalating costs and a compounding of negative impact on the environment.

The construction industry has sought alternative building

The construction industry has sought alternative building materials and techniques in order to limit the traditional expenses of construction. The costs include the high energy costs of manufacturing, increasing scarcity of quality materials and the rising cost of available materials, and increasingly expensive construction labor. Regrettably, the majority of solutions employed so far have only resulted in an increasingly inferior quality to finished product. Consumers desire to lessen the negative environmental impact (i.e.: deforestation, mining and pollution from manufacturing) and negative health effects (i.e.: fluorocarbons and other harmful gases, mold from decay) of some building materials. These factors have forced home builders in particular to consider new construction materials. These new materials must be versatile, easy to use, durable, and energy efficient.

An alternative to the conventional building materials is what may be called Autoclaved Aerated Concrete, hereinafter referred to as "AAC". AAC is superior to current building materials and is extremely environmentally friendly. That is, the teachings hereof will substantially reduce global warming by preserving forests. While this invention applies to any cementitious material which can employ the teachings of this invention, AAC is a preferred material and the further description will be so limited.

AAC was invented in the early 1900's and consists of a mixture of cement, aluminum powder, lime, water and finely ground sand. This mixture expands dramatically, and this "foamed" concrete is allowed to harden in a mold, followed by curing of the hardened mixture in a pressurized steam chamber, or autoclave. Commercial production of AAC began in the 1930's, and presently more than 31 million cubic meters have been produced worldwide.

Compared to wood, steel and standard concrete, AAC is a clearly superior material as it is fire proof, termite proof, self insulating, sound insulating, non decaying and does not rust. Compared to concrete, AAC weighs 30% less than traditional concrete masonry units. Additionally, AAC is well known as an environmentally friendly construction material with certain manufacturing plants receiving recognition as being "Green Factories." Compared to the energy consumed in production of many other basic building materials, only a fraction is required to produce AAC. Raw materials consumption is very low for the amount of finished product produced. In the manufacturing process, no pollutants or toxic by-products are produced. AAC is also completely recyclable.

AAC is an inorganic material that contains no toxic substances. It does not slowly decompose nor emit a gas. Since AAC is both a structural and insulation material it allows the elimination of other materials that can contribute to poor indoor air quality. Due to its inorganic structure, AAC also eliminates the food source condition required to be present for microbial growth to occur. Thus, AAC is resistant to water penetration and decay. As it is a solid cementitious building material, insect (roaches, ants) and rodent (rats, mice) infestation is impossible within walls and floors as there are no cavities as now occurs in standard frame construction.

Further, AAC is non-combustible, so in the case of fire it can help prevent the fire from spreading to other rooms. During a fire, no toxic gases or vapors are ever emitted from inorganic AAC. As building methods using AAC include using solid blocks and panels with very simple connection details, the ease of construction helps to ensure a monolithic, highly fire-resistant wall.

AAC buildings, as described by this invention, can be very energy efficient. This efficiency is due to a combination of high R-value, thermal mass and air-tightness. AAC is the only product currently available that meets Germany's stringent energy codes without added insulation. It is well documented that the R-value of a mass product need not be as high as that of light frame construction, to perform thermally efficiently.

AAC products are unfinished. Depending on the building use or the aesthetic requirements, AAC may be coated with an exterior surface finish of approved stucco, stone, brick-veneer, wood siding with furring, or a combination thereof. On the interior AAC usually has sheetrock installed over furring strips due to utilities and numerous joints of blocks.

While the construction industry recognized certain advantages in the use of AAC components for building, no system exists to effectively take advantage of the superior qualities of AAC in a cost effective manner. In fact, even though AAC is itself considered a vastly superior construction material than current construction industry standard wood, steel and/or concrete, the prior methodologies employed in AAC construction cause ACC to be so much more labor intensive and costlier than current standard construction materials, that the negatives of prior methodologies of AAC construction basically outweigh AAC's inherit advantages and so prohibit AAC from being considered as a viable alternative. The teachings of this invention not only eliminate these prohibitive negatives, they so facilitate the construction of AAC habitats that AAC habitats now can be built in less time and for less end use cost than conventional materials, with the underlying theme being the construction industry's prerequisite "simpler, better, cheaper" motto.

DESCRIPTION OF PRIOR ART

Despite the early development of AAC as a potential building material, there is little in the patent prior art. There is a recent patent, U.S. Pat. No. 5,286,427, Koumal, Feb. 15, 1994, which relates to only a manufacturing process using a modified composition for AAC. While it is helpful in finding a beneficial use for what is now a waste product, it in no way addresses any of previously mentioned problems prohibiting AAC's market acceptance. So while it is helpful in finding a beneficial use for what is now a waste product, it fails in that AAC still has no way of being successful in construction industry, so it is dependent upon this invention for its success.

The present invention is a synergistic whole, completed structure as a precast concrete system and may appear similar to U.S. Pat. No. 5,761,862 to Hendershot et al., Jun. 9, 1998, but that is due only to also emulating a residential structure, as the very nature of material used and processes employed are incompatible. Of the searched Prior Art, it is the closest, yet upon closer inspection it is vastly different in every respect. Hendershot uses a very complex steel reinforcing and joint system, bonding system requiring flared coil loops and sheebolts, structural bearing system requires complex precast steel mechanism, and a hip roof cannot be constructed as even simple dormers are reduced to nothing more than exterior architectural accents placed over constructed roof All prior art requires great quantities of steel reinforcing, steel brackets, mechanisms and/or laborious, precise manufacturing processes facilitating site construction.

Wall process: U.S. Pat. No. 6,098,357 Franklin et. al., Aug. 8, 2000, cites well the problems of all prior art's various block wall systems. Yet, itself requires additional materials for architectural finish, its process of uniquely formed and dimensional blocks greatly exceed the minimal three block vertical height of current art, requires additional steel anchor system, does not even address the problem of utility locations in walls and it is composed of inferior material lacking all the innate attributes of AAC. Referring again to U.S. Pat. No. 5,286,427, Koumal, Feb. 15, 1994, fails in its design in FIG. 5 and description to be so unfeasible that they are only intended as an example of product and no way intended as representative of a construction system. The present invention's processes and articles of manufacture allow for the temperature transfer system which heats/cools the wall for specific purpose of countering exterior environment's temperature effects on wall material. Most prior art is concerned with radiant heating of interior and not stabilizing the insulate properties of the wall's material, therefore their design and processes are either inadequate or unfeasible.

In this invention's support beam system for roof, etc., the prior art of U.S. Pat. No. 4,285,179, Goidinger, employs a lightweight cementitious material in panel form that has longitudinal cavities that are filled with heavy standard type concrete and optionally reinforcing steel which makes vertical wall panels load bearing. The roof beam system hereof with optional reinforcing channel, is novel for following reasons: 1) Goidinger is specifically vertical walls, 2) due to incompatible uses are structurally and dimensionally dissimilar, 3) while Goidinger has internal cavities formed by sandwiching formed wide panel halves together, the solid rectangular beams hereof have much thicker exterior AAC for distinct purpose of receiving "R" screws or similar fasteners and can be shaped in angles to equal roof panel's pitch, 4) beams can have corrugated shaped channel system adding strength and additionally preventing added cement from adhering too quickly to dry sides preventing added cement from adhering too quickly to dry sides and clogging cavity and therefore preventing it from being completely filled, which can be a serious failure problem of Goidinger, and lastly 5) has a utility channel. It is unobvious as no other prior art has specific use of: 1) weaker material used for a structural purpose of receiving fasteners, 2) used solely for structural, load bearing beams spanning space, as without the present invention screws and interlocking beam ends it was almost impossible to engineer such a system for practical application. In regards to beam's interlocking ends, there is no prior art in cementitious material, but U.S. Pat. No. 4,409,763, Rydeem, Oct. 18, 1983 uses a great wood system of one vertically oriented dowel to secure a plurality of intersecting beam ends onto a post, but has no method for a suspended, self supporting, load bearing beam system spanning space. Again, all other prior art in cementitious materials employ complex, heavy-duty steel brackets, support/reinforcing, etc., and still cannot accomplish process of invention.

Presently, there is great waste in conventional roof construction to accomplish the desired architectural look of multiple hips, ridges and valleys. In U.S. Pat. No. 5,794,386, to Klein, Aug. 18, 1998, there is taught a roofing system. More specifically, the patent is directed to a roof panel for sloped roofs and includes a self-supporting reinforced plate of cementitious materials, wherein the reinforcement above the plate has bars running along the slope of the roof. Compared to the present invention it is a very complicated, costly combination of cement and steel reinforcing.

Another aspect of this invention's roof system is its gravity induced internalized gutter system. All prior art with internalized gutter systems for pre-cast concrete panels (Meyers, U.S. Pat. No. 723,175; Novoa, U.S. Pat. No. 3,603,052; Rook, U.S. Pat. No. 6,006,480) rely on force from additional moisture to push accumulated previous moisture out of a level, straight gutter system, and the results are problems of residual moisture and accumulated debris causing damage to gutter system and structure. U.S. Pat. No. 929,684, Mills & Taylor, Aug. 3, 1909, is an example of common design deficiency allowing moisture to run down the face so that debris residue leaves streaks and moisture angle water deflection system.

No prior art addresses either processes or compositions of matter of this invention's roofs water proofing system. Only U.S. Pat. No. 5,981,030 Haupt et al, Nov. 9, 1999 has a figure similar in appearance, but by closer inspection thereof, and by reading the detailed description, the following incompatibilities, physical differences and new unrelated processes become clear: 1) is not used for waterproofing but rather water retention which defeats process of facilitating removal of vapor from AAC roof panels, 2) its process is a solid mass for water retention and not air cavities for venting, 3) the materials used are completely different and incompatible, 4) while absorber (4) is held in place by fleece (1) and joined to base material (5) by a laminate (2), there is no continuity as absorption is confined to small areas (6), the laminate does not coat entire product but on specific areas (6), the fleece has no structural purpose other than to hold absorber (4), 4) quilted absorber areas are of various sizes and perforated coating film contradict teaching of this invention. There is no prior art, nor proven commercial product for matter of composition which will be a satisfactory alternative roof water proofing system. Heretofore AAC roofs were forced to use conventional roofing materials that are labor intensive, costly, add tremendous weight to roof system, and are for the most part environmentally harmful.

While there are pre-cast roof panel systems in the prior art, none could emulate the ridges and valleys of contemporary rooflines. Current methods of wood construction use nominal 4'×8' sheets of processed wood, i.e. plywood, which results in large amounts of waste.

When an existing wood structure requires roofing replacement, prior art systems had no satisfactory way to permanently fasten AAC panels to the wood rafters, nor was there a roofing product light enough for wood structure to support both the AAC panels followed by the heavy roofing material.

In areas requiring sound control, such as near airports, etc., there was no cost effective way to sound proof the roof of a house while simultaneously making it energy efficient and environmentally friendly.

For multi-story buildings, Prior Art U.S. Pat. No. 723,175, Meyers, Mar. 17, 1903 is only prior art of a remote reference to ring/bond beam floor panel and corbel ring/bond beam as the patent shows a wall with floor and roof being incorporated into a single monolithic unit without a separate ring/bond beam. The processes it employs of a mold into which concrete is poured is incompatible with this invention which uses pre-cast pieces.

U.S. Pat. No. 5,143,498, Whitman, Sep. 1, 1992 has a screw with a chamber with laterally disposed openings that are to disperse liquid sealant. The Whitman screw has a single chamber for dispersing sealant which attaches to rubber material as material presses against openings and exterior wall of screw's shaft, which may work for it as it has a screw head which remains exposed outside material and a tight configuration of threads ideal for rubber. U.S. Pat. No. 5,249,899, Wilson, Oct. 5, 1993 employs a shaft for dispersing an adhesive through openings located in a recessed thread which works for it since it is used for pre drilled, machined metals, but would be useless in cementitious product as dust would clog. U.S. Pat. No. 5,516,248, DeHaitre, May 14, 1996 has a plurality of outwardly projecting serrations which burr into the work piece for self locking, but the design is limited to that sole use and design is counter productive in a cementitious material. Standard rebar requires drilling a hole, inserting rebar and then mortar, and in method cannot hold inclined pieces in place.

While there are many references to prior art for tools of routing and reciprocating saws with plunging process, U.S. Pat. No. 5,682,934, Rybski, Nov. 4, 1997; U.S. Pat. No. 5,240,052, Davison, Aug., 31, 1993 references are closest related to this invention, yet they are more complex, confined to independent actions performed on individual pieces at a work station requiring pieces to be later combined with other pieces at site, and are restricted by complexity of guide or design's dimensional limitations as systems lose feasibility when enlarged so cannot create and finish large openings and/or architecturally finish large surfaces of permanent placed, vertically positioned structural material.

U.S. Pat. No. 721178, E. P. Golden, Feb. 24, 1903 does not apply to joint finishing tool as it is for process of removing a prescribed depth of material surface and not just cleaning off an excess of a different material from surface, the patent shows it has two wheels to each side of blade vs. one elongated wheel which serves additional function of smoothing out and imprinting residual material, FIG. 4 shows pressure is exerted on rear positioned blade vs. on rear rolling pin like wheel which drives neutral front positioned blade.

U.S. patent to Planchon, Mar. 22, 1995 shows a reciprocating saw blade with unique tip for starting a hole and cutting, but not a good method for holding tool in position while blade starts hole as one of problems will be maintaining blade in starting hole without opening template guide and tool guide arms.

It is now understood that all prior art and standard industry methodologies employ complex, expensive and labor-intensive combinations of concrete with heavy-duty steel reinforcing and structural support systems/beams that employ complex steel fastening systems.

SUMMARY OF THE INVENTION

Present invention was forced to develop new processes, machines, articles of manufacture and compositions of matter for the effective use of cementitious AAC panels, blocks and shapes for the construction of environmentally friendly habitats. Upon review of Introductory Figures of Prior Art/Current Methodology, it will be noticed that there is not one component that is not either completely unique or modified in such a manner that the resultant process is completely new. Entire structural habitat can be constructed of cementitious product without use of steel support beams, interlocking steel brackets, bolts or other common steel parts (only rebar as building code requires), gutters, down spouts, wood trim, casing, and /or molding, nor conventional roofing materials, yet has the same degree of functionality as a conventional dwelling with these features.

It was discovered that large, precisely dimensioned elements of AAC allow for rapid construction as compared to conventional brick and CMU (concrete block). Their greater dimensional accuracy requires less on site adjustment. The combination of large size and dimensional accuracy allows greatly increased productivity. Due to the light-weight of AAC, reduced equipment demands are realized.

The walls employ processes of minimizing vertical blocks. There are two wall block sizes: mini-wall and wall block. Their differing contributions to wall process will be detailed later. But each wall block has invention's utility channel and is coordinated with other blocks of invention's processes. Each block serves a specific function in the wall itself as well as replacing as many as four separate items required in current construction.

Invention's process of constructing walls of cementitious blocks, such as AAC, is superior in minimal quantity of two vertical components (wall block and top block—with casing block for openings) and three vertical components (base block, mini-wall block and top block—with casing block for openings), structural pieces are pre-finished and simply installed as specified (base, casing, top, crown), are constructed so utilities are inside walls which have finished surface including architectural effects ready for painting.

Openings for windows and doors use present art's casing block with utility chase system and are dimensionally located with components of this invention's process on one foot centers so entire dwelling is an unified dimensional process thereby a standard 8' high wall uses three components vertically and horizontally can have virtually no waste. Invention's alternative process of wall block system allows for all advantages of vertical three block system with less labor as requires only invention's utility channel slot at base which coordinates with utility channel in other articles of manufacture such as casing blocks, etc. To fully appreciate wall block system, to be cost effective in manufacturing and field requires adding 6" of length to AAC industry's standard 20' slurry mold so three full lengths of 82" wall blocks and matching casing blocks can be produced without waste.

Returning to the current manufacturing capabilities, casing blocks, etc. are horizontally dimensional for 1' and 2' center construction. Single wall block is not called a panel as steel reinforcing is not required which is substantial savings. Casing blocks can be omitted and architectural effect added into wall blocks and Top Block using invention's tools.

One example of an advantage of this invention over prior methodology of AAC construction and prior art of CMU block, by using the traditional solid blocks and/or panels there was no good means to provide a finished interior wall without first using wood furring strips and externally positioning electrical utility boxes and wiring which further meant that wood studs and sheetrock or dry wall panels were required; consequently basically requiring two wall systems, or, alternatively routing and then inserting conduit and then having to repair walls. All this added substantial extra labor and material costs to the construction using AAC panels and blocks. Current art's internal "utility channel" system allows all utilities to be placed inside wall during construction and with special "fishing curve" and "multi conduit" inserts allow utilities to be placed within wall even after construction. The current art's utility channel system, inserts and architectural finish provide a structurally superior finished wall with surface simply requiring paint and/or wallpaper as a normal finished sheetrock wall. Current art eliminates all labor and/or forest materials of constructing an additional wall system. Current art even eliminates need for finished wood trim by architecturally finished blocks and invention's tools that are designed to finish vertical, and even upside down, surfaces. Current art's unique wall block system has not only saved labor and materials as compared to conventional AAC construction, it has actually made AAC less expensive and labor intensive than standard construction materials and methodologies.

The top course of a wall is constructed using top block/beam that is dimensionally sized at +/−16". It can be manufactured as a block or a continuous beam, as it can be reinforced and even house invention's air duct system. An industry standard 2' wide panel can be substituted for top block, as wall block's unique shape is critical for process.

A common design problem is resultant gap between the top of a wall where it meets a sloped roof. The crown block with sloped top fits perfectly into this space and allows for architectural continuity. The crown block allows for sloped roofs and, if left with a level top, even additional floor systems to rest on architecturally finished structural components.

As previously noted, AAC buildings can be very energy efficient. A recent study in the U.S. shows that an 8" AAC wall performs better than a conventional 2"×6" wood stud wall system with R-30 Insulation. AAC is ideal for variable temperatures so that the outside temperature is dissipated by change before it can permeate block and effect interior. The only disadvantage to AAC's thermal insulate value is in a location where there are continuous days of below freezing temperatures as occurs during winters in northern United States and Canada, the cold eventually permeates the AAC block. A test in Pennsylvania not using current art for AAC, showed when AAC is exposed to a constant temperature, such as freezing, over a period of time, it was found that a winter's heating expense was the same as a standard 2×4 wood frame home. This is one reason why AAC plants are presently located only in Southern areas, an ideal climate of moderate, fluctuating temperatures. Current art solves this problem through its temperature transferring system manufactured in blocks and panels and is available for climates requiring it. Warm or cool air is simply circulated through holes in exterior half area of blocks. The manufacturing of transfer channels is unique in that the tubes inserted into the pan mold are two conical tubes with threaded ends, one male and one female, which after curing are separated by tool which is inserted into larger end and engages indentations and is twisted to unscrew tubes. The purpose for conical shape is ability to ease withdrawing longer sections of pipe from cementitious material thereby enabling even 20' lengths to be more easily removed.

The utility chase and block wall systems are only a few of the numerous other embodiments and claims of this application which each individually and combined, address specific areas of improvement in AAC construction.

The structural beam system is placed on walls and is unique in being constructed of reinforced AAC or alternatively can be comprised of two cementitious materials, having a center fiber and steel reinforced concrete and outer casing of AAC which accepts the screws hereof, flange bar and/or hollow bar, which are used to fasten roof panels to beams.

The beams can have reinforcing center formed by two halves with longitudinal slots joined and filled, even HVAC duct and a utility channel can be placed inside so trades simply pierce AAC where desired openings are to be located.

Currently the AAC industry does not use AAC for its roof systems in residential application because the required structural steel support beams, etc., rendered it impractical, so industry methodology is to attach a conventional wood and asphalt shingle roof on top of AAC walls. Current art is able to feasibly employ an entire AAC roof system with no steel I beams, support columns, brackets, braces, bolts, etc. The structural beam system allows for all conventional roof designs to be possible, which was previously thought unfeasible with cementitious products due to weight, fastening systems and difficulty of working with product.

Invention's roofing system maximizes AAC's innate attributes by combining structure, insulation, gutter, water deflection, and waterproofing all in one. One of the more important ideas of invention is the AAC roof panel's waterproofing system. The AAC roof panels employ current art's cost effective waterproofing systems, both systems are environmentally friendly products to manufacture, and the consumer use of either invention will relieve landfills of 100,000 of tons of current industry asphalt shingle refuse currently being dumped every year. The current art is designed to never have to be replaced, only re-coated every 10+ years. Roof repairs are easily discovered and can be repaired by an unskilled homeowner. Professional roofers will appreciate ease of application. Both systems not only waterproof, but also remedy problem of AAC's requirement for vapor permeability (to be able to "breathe") so moisture build up does not occur inside habitat. These are only systems known to be able to be applied directly to roof surface and still facilitate vapor permeability.

The indivisible internalized gutter system is similar in that it eliminates costly additional gutter systems that must be maintained and replaced. The water deflection system not only adds aesthetic enhancement but provides process through its unique reverse (upward) angles to cause water to separate from face preventing unsightly runs as well as help dissipate negative effect of water runoff. The gutter down spout box eliminates need for unsightly down spouts and add architectural accent. Because of new roof system interior space is greatly increased by volumes as attic insulation is not required. insulation is not required.

The new beam and panel roof system of this invention greatly increases interior space by creating habitable areas in roof vaults that previously were inhospitable, namely wasted attic space.

The waste-free system taught herein allows for flexible custom application of AAC roof panels so contemporary roof lines are realized. The waste-free roof system can be implemented for hips as well as valleys.

When teachings of this invention are applied to install AAC panels over existing roof structures, they overcome weight, fastening and aesthetic concerns. An unanticipated use may be for sound proofing by removing existing asphalt shingles, etc., and screwing AAC panels directly over wood decking into rafters. The unique screw for installing AAC panels into wood have wide flanges in the area to cover the AAC material. The wood threads on the tip are used to permanently secure the panel into the wood. The threads actually help to control the depth of penetration of the screw, followed by a light weight, environmentally friendly coating.

When constructing multiple stories, invention's ring/bond beam floor panel eliminates several time and material consuming steps. The floor panel has unique modification of top row if reinforcing stopping 1' short of panel end (same as for roof panel for gutter system). This allows invention's ring/bond beam slot to be manufactured. Construction is simply placing beam on top of wall with panel end flush to exterior wall face, inserting required rebar into slot, installing the screws hereof through slot into wall below, which screws engage other reinforcing in panel. The heads of screws can be left protruding into slot and rebar tied to them, then add mortar and immediately next course of block, and continue on with next wall. This eliminates all the following current methodology: 1) place panel end short of face of exterior wall, 2) mortar a block flush to face of exterior wall leaving a gap between panel end and block, 3) place rebar into gap and add lots of mortar, 4) wait day for ring/bond beam to set and then continue construction.

An alternative improvement in time and costs for multiple story construction is method of constructing walls without laying floors or roof until all walls are constructed. This method saves cost trips which can add up to thousands of dollars, as well as additional costs of down labor time for wall crews waiting for crane to finish, The method is for a crown block to be used that protrudes into interior area and forms a ledge for supporting floor system. When all walls are constructed crane simply sets all floor panels into interior area and roof panels onto crown block ledge, all in same day by use of invention screws. The crown blocks serve as ledge as well as architectural finish.

Corbel ring/bond beam is similar, as wall face is routed, using invention's routing system, to receive a pre-cast, reinforced AAC beam. Simply mortar and fasten into place using the screws hereof and then floor or roof can be set on corbel ring/bond beam. This process using unique articles of manufacture allow for quick, strong permanent placements of floor and roof panels where before an entire wall assembly system was required.

Stairs providing access between floors are now able to be cost effectively constructed of cementitious material that immediately gives fire protection. Stairs will not creak and have benefit of muffling a lot of the noise transmitted by standard wood stairs. Current methodology for constructing stairs, especially curved and suspended stairways, require a very skilled craftsman, but now unskilled labor can construct a superior stairway in less time.

The invention screw is an indispensable article of manufacturing which facilitates many of invention's processes. The auger type invention screw now makes it possible in one motion to set steel reinforcing into cementitious product without pre-drilling a hole and having to wait for mortar to set. An example of one advantage, a roof panel set on a $^{12}/_{12}$ pitch can be set in place with invention screws into wall and invention's beam support system and left with no other support. The invention screw locks all pieces together with threads and counter sunk head. An entire roof system can be installed, then the worker comes back and fills all invention screws with mortar at end of day for them to set up overnight. Next day roof is waterproofed.

A few nuances of the invention screw are advantage of invention's flanges on screw head are to gouge out AAC so head can counter sink and simultaneously help lock in place. Unlike any other screw, the invention screw has the ability to be drilled very close to surface without breaking AAC apart because of its auger process alleviating pressure that a standard solid shaft creates. The chambers' unique design actually allows mortar and screw process to make one monolithic piece of separate pieces in one step.

Invention's alternative, the flange bar, is a modified rebar with most of the advantages of the invention bar except it requires pre-drilled holes. Invention's flange bar allows direct bonding and reinforcing as code requires with superior results of centering rebar in hole, allowing mortar to fill hole around rebar, secure rebar directly to cementitious material, hold cementitious pieces in place by flanges imbedded in walls of hole preventing shifting movements, flanges greatly increase holding power. The "R" screw has advantage of one step process while flange bar has less expensive manufacturing costs and can be cut at any length at a point removed from a flange so that a hammer drill can be placed over shaft and the shaft used as a bit.

A hybrid of both the invention screw and flange bar is hollow bar which combines best attributes of both inventions into one unit. It uses invention's cutting device that in cutting uses a crimping action that results in serrations which through bar's twisting action grind AAC into dust and force into hollow core. It has a helix-action with auger flanges which leaves slots for special epoxy (not regular mortar) to be inserted around bar.

By use of the invention's nail screw, the result is synergism in that now one item replaces two previously separate processes with the benefits of both and modifications eliminating detriments. A problem with fastening items into a cementitious product is that the cement is not like wood which holds by a constant expansion pressure upon inserted object, cement holds by a gripping and/or binding to concrete. Therefore when object is removed it can rarely be reinserted into same hole with effective holding power. The invention screw overcomes this problem by gathering dust in its tip which binds, by prongs near head which pierce and hold, torque more pressure via screw head and by ability to reinsert finish nail in hollow shaft and re-explode tip. While prior art, such as Helifix, has advantages of piercing and twisting to hold in AAC, it requires long sections of shaft to work effectively and still wiggles and can work free without mortar. The screw hereof has variable degrees of hold, and via nail exploding tip, has unique process of being permanently set and still retain ability to be removed without damage to AAC or fastener and then even reused in same hole.

Door slabs can be composed of AAC giving great fire safety and sound insulation to rooms. As AAC is non-combustible, current art even has an AAC door that is unique in allowing a four-hour fire rated wall having a specially designed opening.

Tools biggest advantages are ability to be used on vertical plane surface and enabling unskilled workers to make finished openings and other modifications in thick walls, as well as finished trim designs. Most of the tools combine steps so that what required two or more tools and several processes in prior art can now be done with invention's machines, articles of manufacture and processes with one tool and in one step.

Invention's air duct system uses AAC insulate characteristic and duct's structural reinforcing for unexpected result of a manufactured structural component: 1) an internal duct system that is installed during construction of habitat as it is an integral, structural part of habitat, 2) is an insulated forced air duct system which reinforces cementitious material, 3) reduces volume weight of top beam, 4) requires no additional framing, etc., to hide it, and 5) uses process of varying opening sizes custom installed at site to regulate required air supply. Blocks and beams can also be used with a standard sized hole becoming the air duct with no other duct work required.

An advantage of the present invention is its ability to emulate the aesthetic appeal of industry's standard habitats while being composed of a completely different, unique cementitious material. It is the invention's synergy that allows it to overcome problems preventing AAC's acceptance by construction industry. Each of the present embodiments is crucial to whole as it is synergistic, i.e. without support beam system, roof panel system would not feasible, and without invention screws and light-weight roof waterproof coating system the support beam system would not be feasible. AAC systems are environmentally friendly. In contrast, conventional wood structures create a problem of waste, while this system reduces waste to almost nothing. What waste there is can be dealt with by the teachings hereof. It was discovered that the waste hereof is to grind the AAC into powder and then, by optionally adding proper nutrients and fertilizers, turn the mixture into a yard enhancer so that no waste has to be removed from the building site.

The manner by which the system hereof applies the processes, machines, articles of manufacture and compositions of matter will become apparent in the description which follows, particularly when read in conjunction with the accompanying drawings.

BRIEF DESCRIPTION OF DRAWINGS

FIGS. 2BB-1 & 2 are two partial perspective views of wall blocks that are routed with a vertical chase and shaped edges, where FIG. 2BB-1 is an example of architectural design routed on face by tools of invention.

FIG. 2CC is a partial perspective view of an elongated, vertically oriented casing block, showing incorporated utility chase and a curved insert to facilitate pulling/fishing electrical wiring or cable through the blocks. It is adjoining a finished wall block.

FIG. 2DD is top block beam that combines functions of a header for openings and a bond beam for wall and can house utility channel and invention's enclosed, insulated duct system.

FIGS. 2G, 2HA and 2HB are several views illustrating curved AAC blocks and manufacturing procedures, along with exemplary shapes for said curved blocks.

FIGS. 2I and 2J are a series of views showing a preferred manner of providing temperature transfer within an AAC dwelling.

FIG. 2K is a view of inserts to form a temperature transfer system.

FIGS. 3A through 3I are different views illustrating various aspects of a roofing beam support system according to this invention.

FIG. 7AA is an exploded perspective view, FIG. 7BB is an end view, and FIG. 7CC is a partial perspective end view illustrating a preferred hollow bar, a hybrid of a unique screw and flange bar which replaces standard rebar, and FIGS. 7DD and 7EE are views of and selected tools used to cut, crimp and create serrated ends in hollow bar.

FIGS. 7AAA through 7CCC are different views illustrating a preferred flange bar, showing a modified rebar as used in fastening and holding pieces in position until grout can be added.

FIGS. 7E and 7F illustrate fastening devices for installing panels onto wood and steel roof supports will the indicated bit of a screwdriver. FIG. 7EEE illustrates a prior art device being driven with the indicated head of a hammer.

FIGS. 8A through 8D are various views illustrating a dual functioning screw for attaching items to AAC materials.

FIGS. 9A through 9C are selected views of an AAC stair case assembly.

FIG. 10 is a top view of an improved firewall with opening and door.

FIG. 14 is a perspective view of a pair of AAC crushing rollers members for converting and transforming the AAC waste into a suitable fertilizing base for trees, soil conditioner, and the like.

FIG. 15 is a side view of a joint cleaner for removing and smoothing excess grout from a seam.

FIG. 15A is a perspective view of the joint cleaner of FIG. 15.

FIG. 16 is a partial side view of a double edge cutting blade for creating openings in AAC walls.

FIG. 16A is a perspective of a portable cutting tool using the double cutting blade of FIG. 16.

DETAILED DESCRIPTION OF PREFERRED EMBODIMENTS

Figure 1:
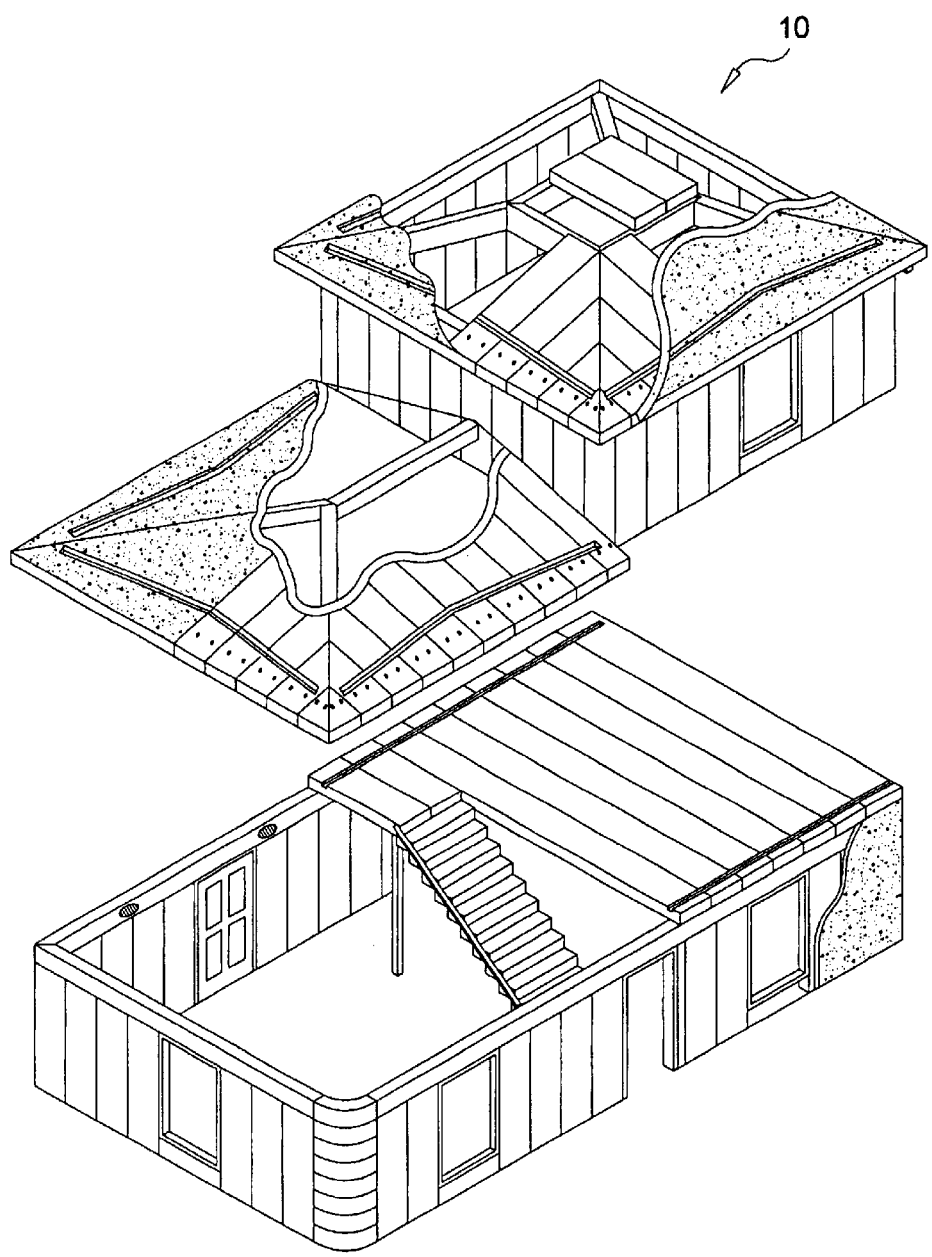
FIG. 1 is an exploded perspective view of a partial, two a story cementitious dwelling constructed in accordance with the teachings of this invention, showing specifically a first floor construction, with portions removed, a second floor with a partial roof to override the first floor, and a partial roof section to override the remainder of the first floor.

The present invention relates to a system for manufacturing structures and habitats of cementitious materials, more particularly by the use of an autoclaved aerated concrete. The invention will now be described with regard to the several Figures, where like reference numerals represent like components or features throughout the various views. Though the invention has applicability to a variety of cementitious materials, the further description, for convenience, will be restricted to the use of autoclaved aerated cementitious (AAC) materials. Turning now to the several Figures, FIG. 1 is a perspective view of an AAC constructed structure 10 according to the techniques of this invention, while FIGS. 2A to 2C illustrate sections of structure wall blocks 200A and 200B.

AAC blocks are typically formed by first preparing a slurry of the AAC mixture and placing same into current industry standard, large mold measuring approximately 4' wide by 24" deep and 20' long. After the slurry sets, the form may be lifted out of the tray and cut into the desired sizes. Industry standard panels are always steel reinforced and sized 2' wide by +/−8" thick and when used for walls are +8' long (for vertical height). Most blocks are usually 8" wide by 8" tall×24" long with only one USA plant manufacturing a jumbo block of 2'×4'×8".

The system hereof shows manufacturing modifications of 8"×16" for top block, which is coordinated with wall block of industry standard 2'×4' but new dimensional length of 82" which requires modifying mold length by additional 6", from the prior art, so three lengths of 82" wall block as well as coordinated casing block can be manufactured without waste. Accordingly, one preferred size is wall block 200B having an elongated dimension of standard pre-hung doors with only jambs to slip flush into invention's casing block system so that no additional wood trim is required or customizing blocks at site. Further, through the use of the large blocks 241, and the unique and precise manufacturing techniques, it is now possible to construct a habitat with the architecturally finished structural components. That is, the blocks 12 have specifically located architectural finish along the edges of faces that will be abutting at joints of the blocks and hides the seams and surface deflection. This eliminates the need for extra surface finish, wood molding, other material or labor. The finish need only be a paint or a superficial layer of smooth stucco, as known in the art.

Figure 2A:
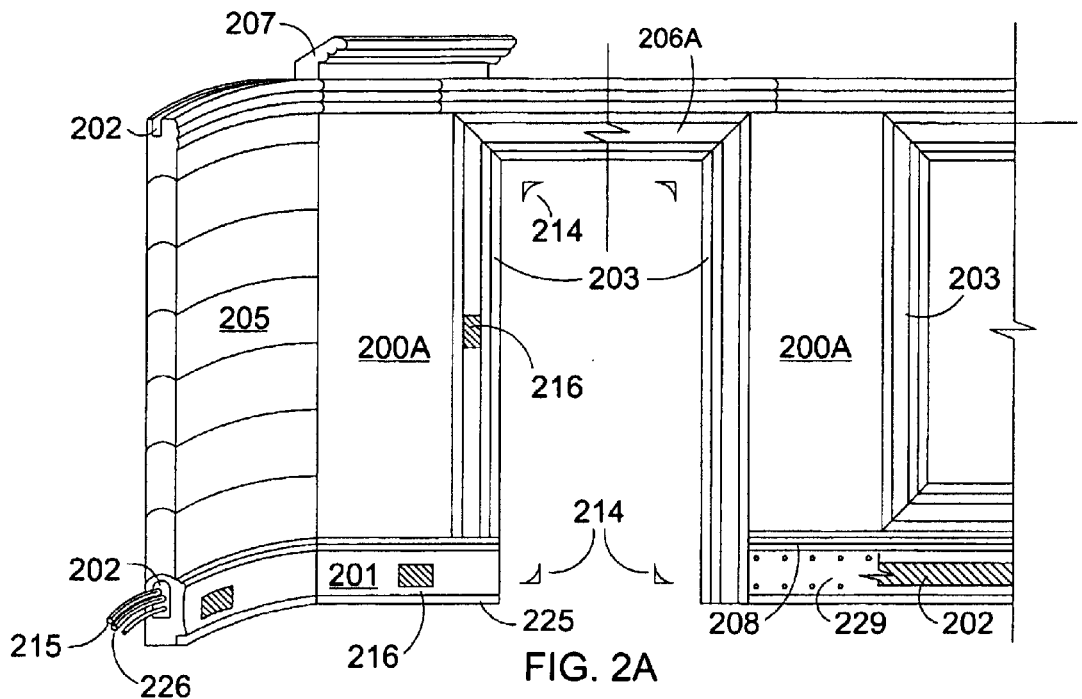
FIG. 2A is a partial perspective view of a wall, with a door and a window opening, using in section, a base block and mini-wall block combination, top block/beam and optional curved block wall, showing architecturally finished coordinated seam system that enables thin coatings previously considered insufficient.
Figures 2B, 2C:
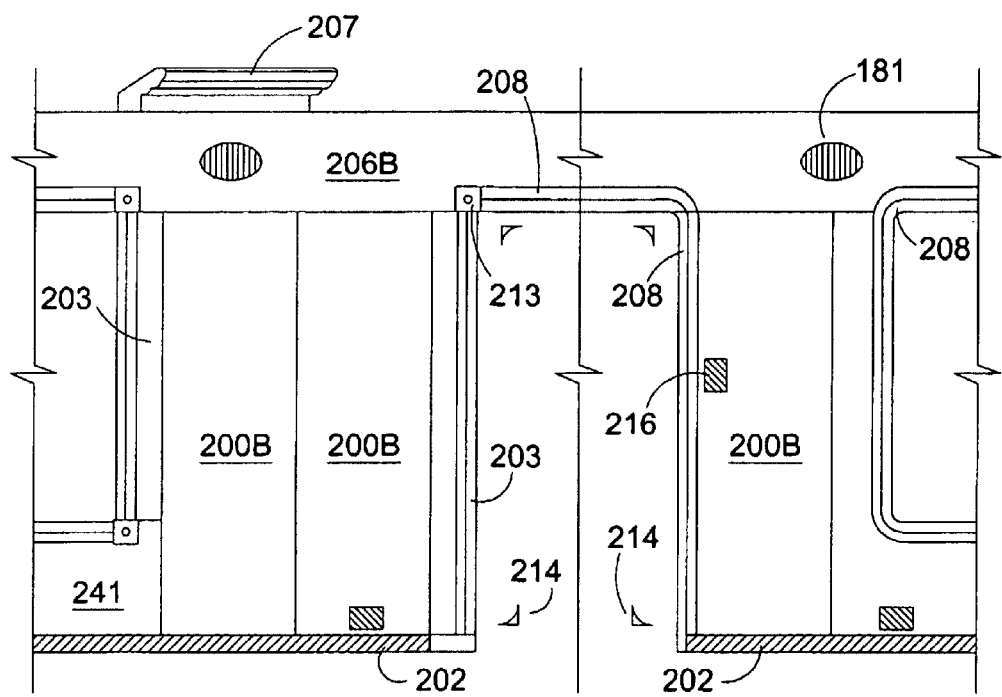
FIG. 2B is a continuing partial perspective view of a wall, with a door and a window opening, omitting base block and mini-wall block and substituting them with a wall block and big base block showing architecturally finished coordinated seam system revealing a sloped and architecturally finished crown block on top.
FIG. 2C is a continuing partial perspective view of a wall, using a second story on floor panels, with a door and a window opening, substituting top block with top beam over openings and omitting wall block and substituting full wall blocks, with architectural features added after installment.
Figure 2B:
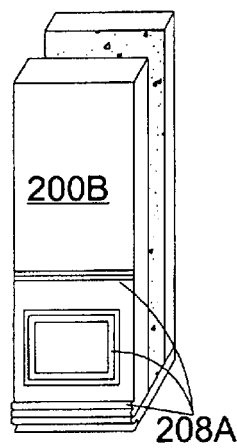
Figure 2B:
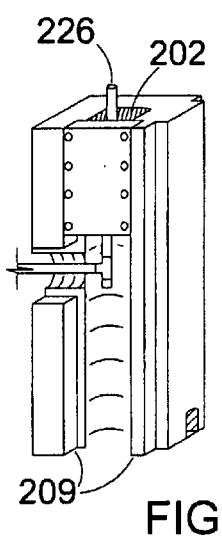
Figure 2C:
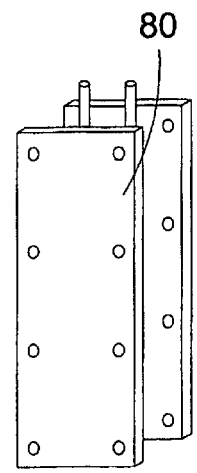
Figure 2C:
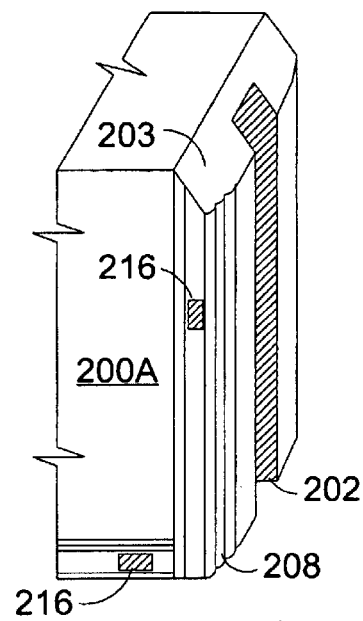

As illustrated in FIGS. 1 and 2A, the system hereof is amenable to the use of curved wall sections 205. FIGS. 2G and 2H illustrate techniques for manufacturing the curved wall sections 205. That is, alternative curved blocks 205 are manufactured by wires, as known in the industry, but modified by being connected to a computerized, mechanical arm which cuts AAC as pattern and arrows as illustrated. There are presently no curved blocks being manufactured anywhere in the world to the knowledge of Applicant.

For more frigid climate construction applications, reference is made to FIGS. 2I and 2J, showing the invention's temperature transfer system. The manufacturing of transfer channels 54 is unique in that the tubes 251 inserted into the pan mold 250 are two conical tubes with threaded ends 255, one male and one female, which after curing are separated by tool 253 which is inserted into larger end and engages indentations 252 and is twisted to unscrew tubes. Optional flange 254 on female conical tube holds it stationary while male tube is first unscrewed and withdrawn. The purpose for tool and conical shape is ability to ease withdrawing longer sections of pipe from cementitious material, as tool employs fulcrum to initially break tube free and then conical shape allows for no resistance as withdrawn. This now allows for extremely long voids/channels to be easily created. Also ends the need for coring of individual blocks as is currently done since blocks cut with void suffice.

The temperature transfer system of this invention allows for excess heat, usually wasted and/or lost, to be realized and circulated 58 via air channels 54 throughout exterior walls 200A and panels 40 of habitat. System can employ a geothermal 56 and solar 55 storage tank 52.

After the cementitious materials are prepared, construction can begin. Initially a superior concrete foundation, or footer with slab is poured, as known in the art, to present a base for receiving the AAC blocks. The blue prints, as known in the art, are measured and laid out on floor by a qualified individual. Correct designations are marked on floor for openings, block type, location of outlets, etc. From this point a small crews of four unskilled workers using a level, trowel and drill can construct a quality habitat in half the time of a comparable "stick built."

A first step in constructing invention is the wall system, FIGS. 2A through 2C. The process comprises selecting a discontinuous first course of elongated AAC base blocks (FIG. 2A) for placement on a pre-built foundation. A base block 201 is one solid structural finished component that is load bearing, utility receiving, architecturally finished and uniquely dimensionally processed. The respective +/−10" tall×+/−9" wide blocks are oriented with a longitudinal slot, called a utility channel 202, see also FIG. 2I, exposed along the upper surfaces or/and along the vertical face thereof, into which utilities 217, 216, 123, 124 are inserted and later covered by subsequent course and/or preformed, dimensional type of cementitious board 229 which fits perfectly between notch 225 at the base and start of architectural finish 208 so that there is no seam and it becomes integral part of design.

Alternatively, the base block 201 may be omitted and the mini-wall blocks 200A substituted with wall blocks 200B, see FIG. 2B. Wall blocks have a custom notch design near base 202 (FIG. 5B) that is covered by flooring and/or optional baseboard. Another alternative (FIG. 2C) may be the omission of casing blocks and instead, wall blocks 200B are architecturally routed, including utility chase. All blocks work with the present invention's utility channel system.

Whatever block process is used, the blocks are cemented into place and leveled, except where door openings 212 are located. Initial leveling is critical as all subsequent courses of blocks can be laid directly on the base course without further delay as subsequent leveling since AAC blocks are dimensionally accurate.

Figures 5A, 5B, 5C:
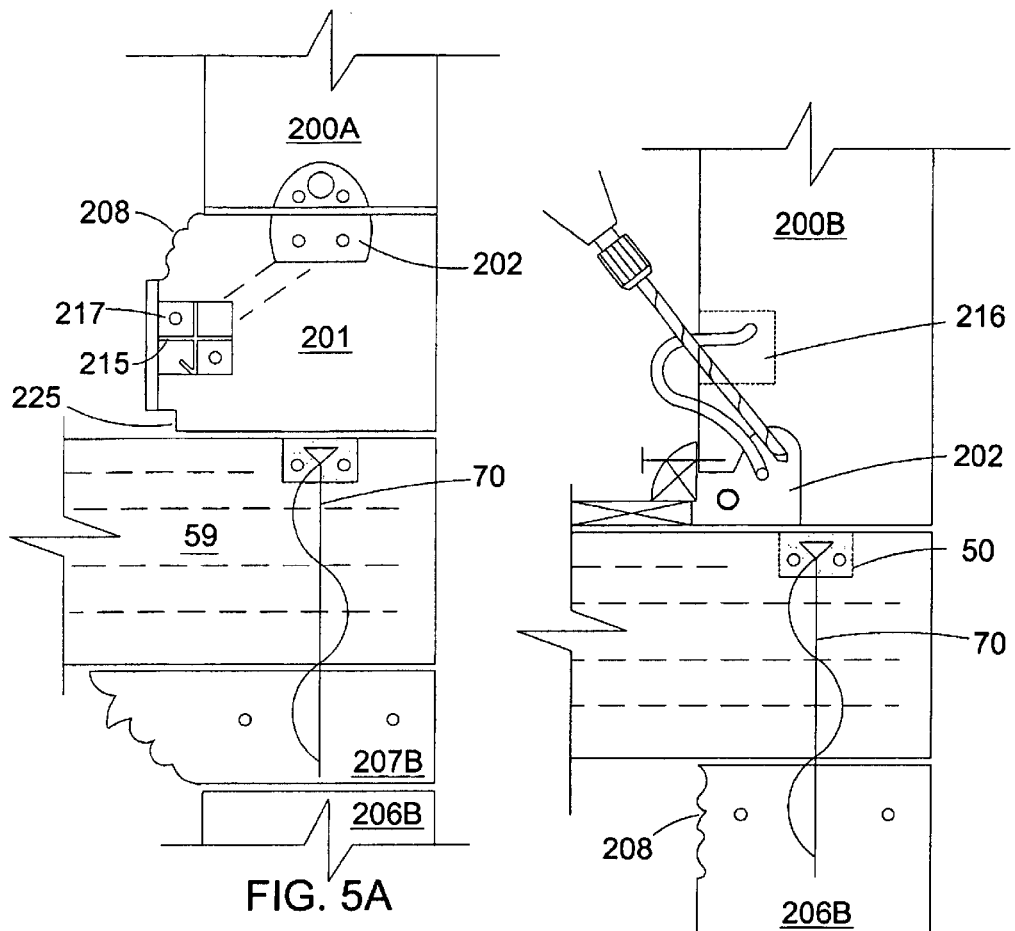
FIGS. 5A and 5B are two views showing further this invention's panel bond beam system. invention's panel bond beam system.
FIG. 5C is a cross sectional view of a wall detail showing invention's panel bond beam in conjunction with invention's wall block and top beam with duct system, routed with casing block design for spanning opening.

Continuing description using base block 201, as apparent, the purpose of the slot, as best seen in FIG. 5A, is to receive utilities, i.e. electrical wiring. After utilities and all inserts, etc. are placed in the utility channel 202, then a thin cover composed of plastic or paper may be placed over utility channel 202 opening to prevent special AAC mortar 19 from falling into utility channel 202 when constructing subsequent blocks and panels, as mortar would obstruct future installments of utilities which can be pulled/fished. Additional utilities can be placed on top of the base block 202 which are accepted into the utility channel 202 in base of second course 200. The base blocks 201 are +/−10" high and +/−1" wider than mini-wall blocks 200A and have architectural base board finish 208 which recesses and reduces base block to width of subsequent mini-wall block 200A. The base block 201 also has optional variably sized recessed notch 225 at base for overlapping the flooring. Reference numerals 208 & 225 create the invention's unique attribute of being architecturally and functionally equivalent to a baseboard; so even while housing utilities, it is structural and functional as well as having ornamental finish.

Outlets 216 may be located into the base block 201 by cutting opening using special rotor plunging tool and template guide. Outlet boxes, etc., fit exactly into opening formed by template guide and are fastened into place, preferably using a proprietary nail screw as illustrated in FIGS. 8A through 8D.

Thereafter, a method of vertically orienting and cementing comparably designed, plural mini-wall blocks 200A onto at least certain of the first course of blocks, where the height of each block is a multiple of a nominal dimension of "X", where a typical miniwall block is 6', and "X" equals 2'. Mini-wall blocks 200A are preferably 72" high, do not require wire reinforcing as does standard wall panels that have manufacturing difficulties and additional costs, but have advantages of panels in quick installation and can be routed, see FIGS. 2BB-1 & 2BB-2. Mini-wall blocks 200A can have utility chase system 202 integrated into ends and sides to form horizontal and vertical utility channels.

Alternatively to mini-wall blocks mounted on base blocks is a method of employing wall blocks 200B, FIGS. 2A & B. Wall blocks are +/−6'-10" tall so top equals height of standard door with frame. Wall blocks which have hidden utility channel machined into bottom, FIG. 5C. Additionally, specially designed tools are able to architecturally finish wall blocks 200B with casing design and utility channel allowing for omission of casing blocks.

In any case, thereafter, plural elongated casing blocks 203, FIG. 2CC, preferably the height of wall blocks, are vertically oriented around the first horizontal course where openings 212 for doors and windows are to be placed. Invention's casing blocks 203, FIG. 2CC, are used for window and door openings and are structural, integral components of wall which have architectural finish 208 and can have a utility channel 202. Electrical switch boxes 216 can be located in casing blocks 203 at door openings and are constructed similarly to outlet boxes 203 in base blocks. The slots for the utility channel are of such a width that when windows and doors are installed their frames conceal slots and only caulk or shoe mold is required to finish. The top beam has casing block's architectural finish where openings are located.

Casing blocks have vertical and horizontal "X" factors. Vertically, the same dimensional vertical "X" equals wall blocks 200A & 200B, so their top heights are level. This level height is optimized at +/−6'-10" to match rough opening for doors and windows. Horizontally, casing blocks are "X" equals 2' or 1', so that either 17+/−" wide for full size openings (ex: 36" (3'-0" door)+2+/−" (¾"+¾" frames & gap), +34"+/−(two 17" Casing Blocks)=1' center), or 14" for half size openings (ex: 30" (2'–6" door)+2+/−" (¾"+¾" frames & gap), +28"+/− (two 14" Casing Blocks)=1' center). The walls are constructed on 1' centers with minimal waste. By disciplining design using matching units a wall can be constructed without having to cut 2' wide wall blocks. Doors and windows with ¾" jambs can slide under subsequent course and into opening, requiring nothing else to flush finish other than trim or caulk, as the architectural finish 208 on blocks blend into door and window frames and become one architectural unit when painted. Conventional finishes have architectural finish added onto wall and so protrude away from wall, while present invention has finish recessing into structural walls as walls are thick enough to use the invention's time and material saving process.

A simplified wall process is for the tools, see FIGS. 11A through 11D, hereof to architecturally finish 243 wall blocks FIG. 2C, at openings and create utility channel 202 so that a casing block is not required, as wall block has features of casing block machined into it. The width of opening is flexible so that only top block/beam 206 acting as header spans or big base block 241, see FIG. 2B, used under window are cut to fit. Big base blocks 241 are basically wall blocks turned horizontally so all window openings can have standard height from floor of 24" and variable width. This is preferred method of all options.

Where the utility channel 202 intersects with other blocks or changes angles, in a preferred embodiment, a curved insert 214, FIG. 2A, sized to be slidably placed into the longitudinal slots 202, may be placed into perpendicularly converging utility slots to provide a continuous curved path for easy wiring of the erected structure in future after direct access is closed off. By this arrangement, and with pre-positioned openings extending to the inside from the longitudinal slots, the entire structure may be suitably wired with recessed utility boxes to present a wall surface suitable for finishing.

Where architectural finishes 208 for casing blocks 203 and top block/beam 206B meet, an architectural insert 213 is placed to cover incompatible intersection, see FIG. 2B.

Figure 2D:
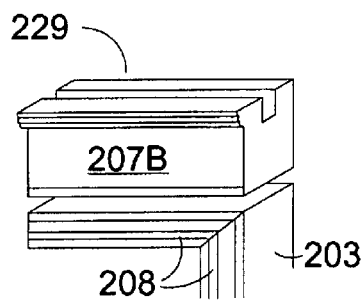
FIG. 2D is a partial perspective view of a top block which dimensionally compliments wall block to allow precise height dimension for doors and window openings, showing the invention's casing and utility channel as well as industry standard slot for reinforcing.

Top block beams 206, FIG. 2D, are placed as a horizontally oriented course of comparably designed AAC blocks, where the longitudinal slots 202 over the openings, such as doors and window openings, and casing finish 208 are exposed downwardly toward the opening. An optional architectural finish 208 can give a crown molding appearance to top block where floor panel 59, FIG. 5A, will rest on top block 206. Top block are preferably manufactured as beams and have enclosed air duct system and reinforcing channel that coordinates with roofs beam system.

Thereafter, the top most course of wall, comprised of invention's +/−16" top block beam 206, is placed on wall blocks 200A, 200B, not 200C, and/or casing blocks 203. Top block can have variation of architectural finish 208 as casing blocks for windows and doors, as well as continuous design to equal crown molding, which allows for one structural component, top block, to replace four standard pieces: header, filler, casing and crown. Additionally, top block is of specific dimension so that base block, mini-wall block and top block form a minimum 8' high wall. A unique feature of this invention is the provision of an effective method to construct a dwelling using primarily precut and sized blocks of cementitious material. By the use of such cementitious blocks containing specific dimensions unique to this invention process and not in prior art, an 8' high wall can be constructed using only two blocks (or three if using base block) which blocks have specific, unique design and functions beyond just dimensional advantage. Blocks are additionally modified with predetermined slots and openings termed utility chase system for utilities, i.e. electrical wiring, plumbing, etc., facilitating construction of habitat.

Further, also employing tools for finished architectural routing for either the base block, casing, features for openings, and/or crown block, smooth finished walls are transformed into architectural finished walls with no additional materials.

For rounded walls and/or corners, if desired, one may employ arch shaped rounded blocks 205, where the rounded shapes of such blocks may be accomplished by inserting rounded mold (FIG. 2G) into an industry standard AAC pan. Alternatively, a computerized mechanical arm may run wires through cementitious material (FIGS. 2H) in a unique pattern producing curved blocks with very little waste, and which waste is able to be recycled as it is still in green stage before autoclaving. This finishes wall construction processes.

Figure 6:
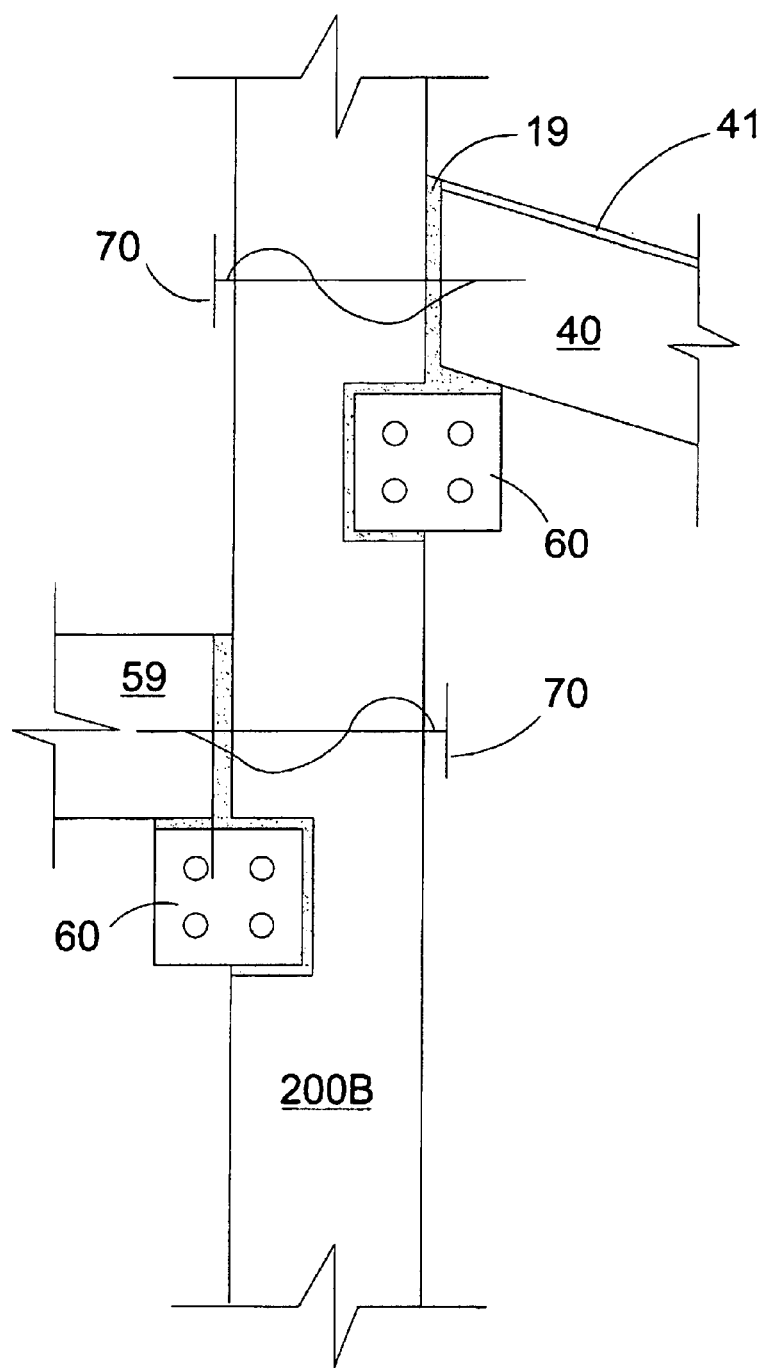
FIG. 6 is a partial side view illustrating invention's corbel bond beam system which allows floor and roof panels to be secured directly to a cured cementitious mid wall sections.

The corbel bond beam system (FIG. 6A) is the system's approach to attach floor and roof panels directly into the mid wall section surface instead of on top of walls that requires a great deal more construction effort and material. The corbel slot is formed at manufacturing or on-site field routed using the proprietary tools according to this invention, see FIG. 11A, with different bit. The corbel bond beam 60, which is reinforced with rebar 35, is set into the slot with mortar and fastened with the proprietary screw 70, note FIGS. 7A through 7AAA, or the invention's alternatives, which engage rebar reinforcing.

When there are multiple floors, floor panels can be placed directly on top of first level wall top block/beam (FIG. 5A) with panel end flush to exterior wall. Floor panels, according to this invention, may use invention's bond beam slot 50 and proprietary auger screws 70 to effectively replace several steps of prior methodology. In prior art systems, a bond beam was to first drill vertical holes into top of wall, then short sections of rebar were mortared into holes, and thereafter a long, horizontal rebar was tied off to vertical rebar. This necessitated a space between end of floor panel and a block placed flush to exterior face of wall. The bond beam was formed in the gap between panel end and wall block using rebar and mortar. This method required additional material, labor and days of curing time before subsequent floors could be constructed. The present invention eliminates several steps and materials and allows construction to continue uninterrupted.

Floor panels 59, see FIG. 5B, hereof have unique bond beam slot 50 achieved by manufacturing AAC similarly to roof panels for a proprietary gutter system, see FIGS. 4A through 4D, where upper course(s) of steel reinforcing 52 stops short of panel end than other layers so slot can be routed and bit not hit reinforcing steel. Rebar 35 is horizontally laid in bond beam slot 50 and tied to screws 70 and then bond beam slot is filled with mortar 19 as base block 201, which is the first course of next wall, is laid.

An alternative floor support system is illustrated in FIG. 5B for a crown block 207B to be placed into wall during construction to support floor system. This invention's method allows for wall construction to continue until all walls are constructed before floors and roof panels are installed. When floor panels are installed, the gap between end of floor panel and wall is filled halfway with rebar 35 and mortar 19 and becomes bond beam. The upper half of gap is left a void and becomes a utility channel 202 for wires 217 and other utilities to be inserted. Outlets 216 are placed in floor panel using invention's method in area void of reinforcing. Finish floor covers uniquely located utility channel or small gap that can be filled with additional mortar.

Where stairs are employed to travel between floors, the invention's stair system is employed as shown in FIGS. 9A through 9C which are partial views of stairs made entirely of AAC. There is no prior art of cementitious stairs being supported only at ends and reinforced by adjoining steps. All prior art uses either steel reinforcing throughout or supports in middle of stair, which extends to ground along total run of stairs.

The invention's stair system uses cementitious blocks 90 which have an angled slot 91 that corresponds to the desired pitch of the stairs. The angle support brackets 92 are secured to the wall at the desired pitch of stairs, which pitch corresponds to slot 91 in cementitious block. Blocks are simply slipped onto support bracket at top of stairs in gap, see FIG. 9B, reference numeral 93, between brace and floor and then slid down and mortar 19 to secure onto top of previous block. Optionally, a screw 70 can be used for additional fastening. The angle iron 92 with special slot 91 makes a permanent structural unit. Mortar placed on ends of stairs additionally bonds stairs to AAC walls. Face of cementitious AAC blocks can be routed to have a tread 94 and/or other architectural advantages. The advantages allow for additional safety of fire proof stairs cases which are devoid of squeaking.

Figure 4B:
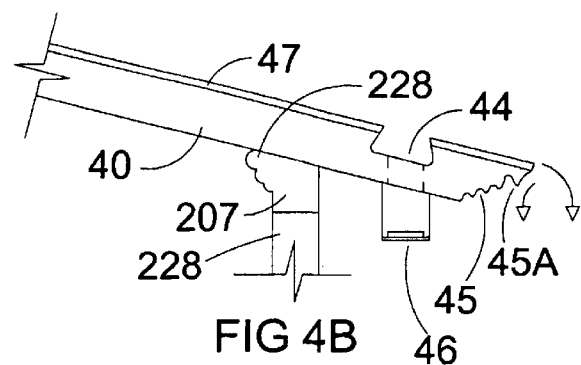
FIGS. 4A through 4D are different views illustrating various aspects of this invention's water proofing system, and gutter/down spout system, as applied to roof and invention's moisture removal system.
Figure 4C:
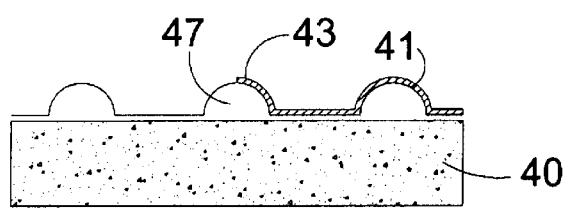
Figure 4D:
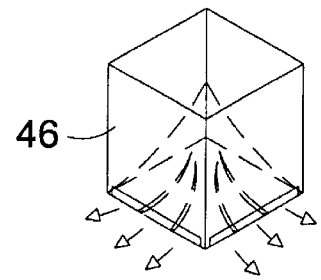

Thereafter, if there is not to be an additional floor, on the top most course of wall comprised of top block, a crown block 207, FIG. 2A, featuring a sloped top wall 228 is cemented to the top course. The slope is comparable to the roof slope so that the roof panels may be supported thereon and secured by suitable fastening means. FIG. 4B further shows a tapered crown block 207 secured to the top of the wall for mounting a roof panel (40) and roof support members. The crown block has a slope equal to the roof panel pitch and is manufactured by taking a standard base block width and cutting in half so that mirror sides equal slope pitch of roof. The interior face is routed to resemble crown molding. The result of this inventive technique is a single structural piece of cementitious material that has architectural attributes of finished wood trim and is used to bond pitched roof panels to flat walls. Crown blocks with a level top, instead of angled to the roof pitch, can also be used to add height and design features to any wall.

The roof is constructed by first securing AAC roof panels 40 to the roof support beam system, beams 30, 31, 32, where a typical roof has a plurality of beams arranged in specific load and stress managing pattern.

The construction method may be continued by positioning the invention's support beam system, see FIGS. 3A-3F, on walls. The cementitious beams are comprised solely of cementitious material with steel reinforcing, and optionally can have invention's reinforcing channel 36, see FIG. 3F. Support beams require only mortar and fasteners as unique interlocking design, FIGS. 3C & 3D, eliminates need for interlocking brackets, bolts, or other mechanisms. All types of roof pitches and designs, including hip and valley, FIG. 3A, are now possible for a purely cementitious roof and support system.

The supporting beam system with reinforcing channel 36 is constructed by placing rebar into channel (and utilities), tying all rebar together, which can include rebar coming from foundation/slab, then drilling holes into beam and pouring mortar into beams 38, FIG. 3F, so that incredibly strong support beams result. The invention allows for AAC surrounding hard concrete reinforcing channels to receive fasteners 70 and so secure roof panels to supporting beam system. Invention's roof system requires no brackets, braces, bolts, etc., as does all prior art. At most what may be required are tension tie rods for certain hip roof designs to give walls extra support.

Figure 2E:
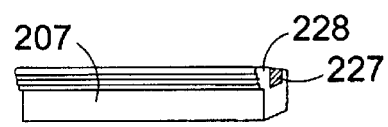
FIG. 2E is a partial perspective crown block, having crown molding, showing a tapered top wall with a longitudinal slot and crown block used as floor support system.
Figure 2F:
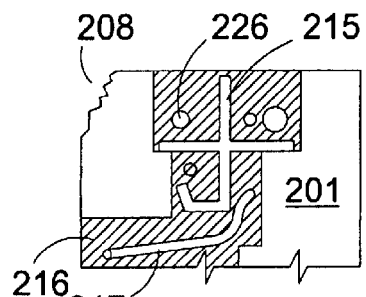
FIG. 2F are two views, perspective and plan, showing a special molded plastic insert to convert a utility chase into a multi-chamber chase.
Figure 2D:
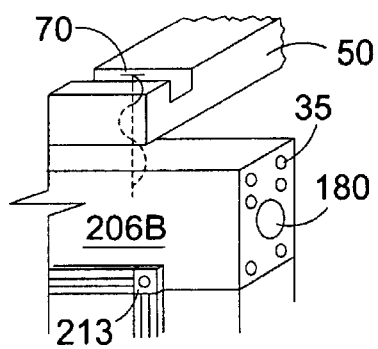
Figure 2F:
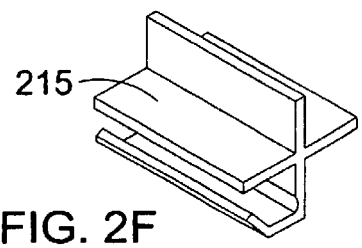
Figure 7A:
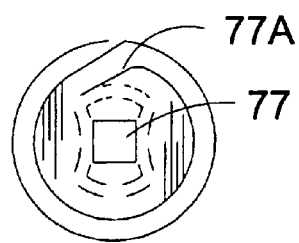
FIGS. 7A through 7D are different views illustrating a preferred auger screw, "R" screw for securing AAC materials according to this invention.

The construction process is continued by placing roof panels 40, see FIGS. 3E and 3F, on supporting beam system. When a roof is resting on standard 8' wall instead of a second floor FIG. 4B, then a fourth level of blocks comprised of crown block 207 can be used. As best seen in FIG. 4B, a series of crown blocks 207, preferably eight (8) inches in height, are cemented to the planar surface 229, where the crown block 207 features a slanted upper surface 228 for receiving an angled roof panel 40. The panel 40 may be secured to the crown block 207 by invention screws 70, as shown in FIG. 7A, and mortar 19 as known in the art, on planner surface. Crown blocks, FIG. 2E, can also be structural for openings with cavity 227 being filled with rebar and cement.

The beam system utilizes the invention's optional reinforcing channels 36, FIG. 3F, which can be used in addition to standard reinforcing to facilitate easy construction and provides even stronger support due to internal bond beam/utility channel tying together the entire habitat. Beams can have a squared edge corrugated pipe 36 inserted into the AAC mold during manufacturing. The AAC fits between the square corrugation in pipe and holds fast and is strong enough to remain intact during initial construction. The hollow corrugated pipe (36) at site has rebar 35 placed inside, as well as any utility conduits 26 desired, which conduits can be accessed for lights, etc.

Roof beams are erected and fastened so that the hollow core formed by corrugated pipe, which is termed reinforcing channel 36, align each other at intersection/joint of beams. After beams are joined together and set with proprietary screws 70, the AAC mortar is pumped throughout the reinforcing channel system 36 resulting in an incredibly strong beam system that ties the entire structure together. This reinforcing channel system also allows invention screws to fasten roof panels into the softer AAC portion of the beam. Optionally, FIG. 3H, a standard concrete beam 19 can be constructed and then an AAC beam 30 adhered with mortar to top of concrete beam so result is a dual material beam which has softer cement for fasteners on top and harder, reinforced concrete on bottom. The concrete beams can be constructed and poured at site with foundations.

While any type of pipe can make reinforcing channel, the reasons for using optional corrugated pipe or corrugated, helical conical mold insert 255 (FIG. 2K) which unscrews from mold, are: 1) the corrugation gives extra surface strength and adds additional strength to reinforcing channel when filled with concrete as two cementitious materials bind against each other; 2) the corrugation prevents AAC outside and cement inside from separating from pipe during stress flexing; and 3) the corrugated pipe allows mortar to flow throughout entire system as AAC is known to absorb moisture so quickly that if system had only exposed AAC the mortar may quickly adhere to channel walls, possibly clogging channel and thus prevent mortar from reinforcing certain areas.

The roof panel system is then fastened to the beam system. The teaching of the present invention's waste-free system is illustrated, in part, in FIG. 4E. This simplifies construction by manufacturing a standard length precast cementitious panel for the entire roof system. Once the length is determined, the parts (A), (B), (C), and (D) are simply cut off site and delivered and installed in a manner which emulates contemporary roof lines without waste. The cut angles of 30° and 60° (FIG. 4G) are turned to meet each other, i.e. (A) to (A) through (D) to (D). When laid at a 45° angle incline, FIG. 4H, or as known in the art "$^{12}\!/_{12}$" pitch, and installed on the invention's teachings of the beam system, FIG. 3A, it creates a perfectly mirrored hip or valley, FIG. 14F. The roof layout, FIG. 4E, becomes simplified and cost effective with zero-waste. Also, what is lost as just uninhabitable attic space under typical roof constructions becomes finished living area, FIG. 4H, by the teachings of this invention.

Figure 4A:
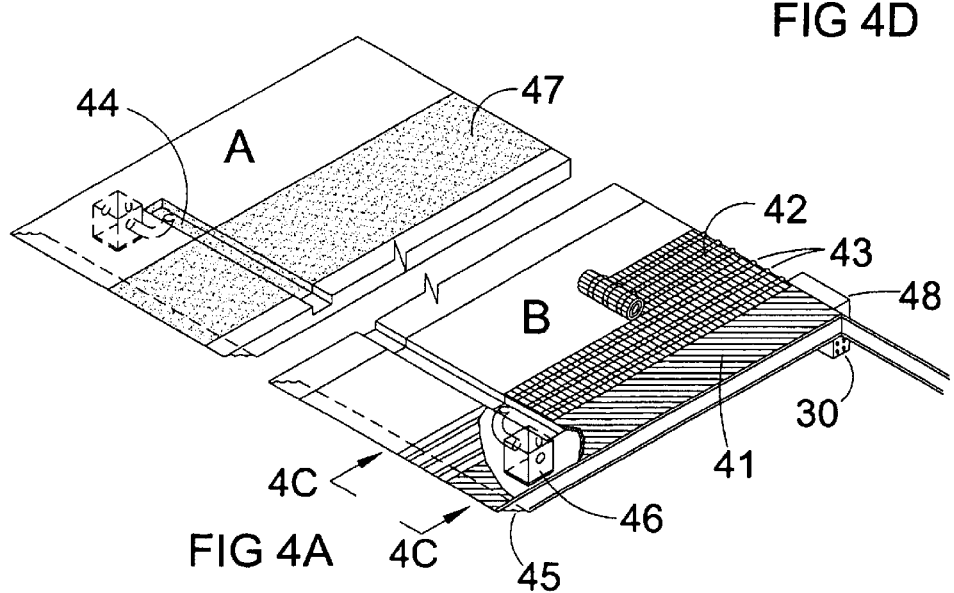
Figure 4E:
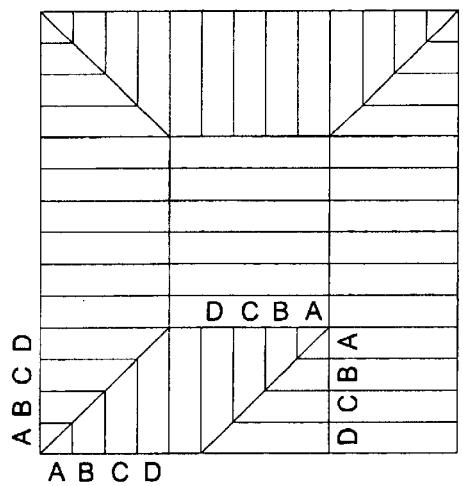
FIGS. 4E through 4H are views illustrating the waste-free roof panel system according to the present invention.
Figure 4F:
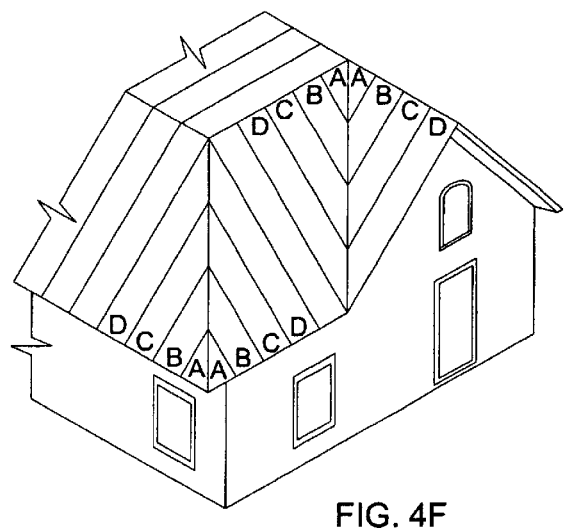
Figure 4G:
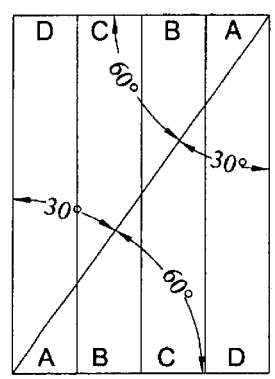
Figure 4H:
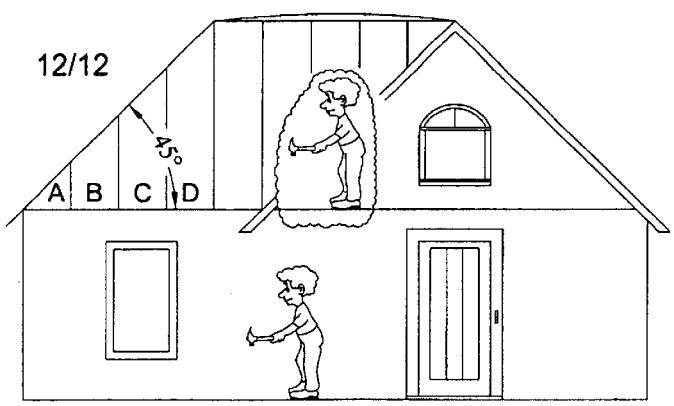

The roof panel system is then fastened to the beam system and roof panels waterproofed. The roof design is identical for both sections A and B of invention's roof waterproofing system (FIG. 4A). Section A is a perspective of a finished stage using a different water proofing material 47 than Section B's segment which is shown at an initial stage in its construction using the technology hereof. It is important to note that the invention's water proofing system for roof panels is of four distinct processes/features, namely: 1) water proof coating 47 &/or 41; 2) the facia water deflection system 45; 3) integrated gutter system 44; and, 4) gutter box 48 which replaces down spouts. The gutter box 48 comprises a generally rectangular housing portion 61, see FIG. 4D, having at least one wall opening 62 for receiving water overflow from the angled gutter slot 63, a tapered lower wall 64, and a pair of outer walls 65 that feature water outflow slots 66 at the bottom of said outer walls 65, note the water flow arrows. The roofs water proofing system is constructed as follows:

FIG. 4A, section A, 47 is a composition of matter for a roofing material, having the following characteristics: waterproof, climate durable, chemical resistant, vapor permeable ("breathes",) high modulus of elasticity (stretchable), durable (10+ year use expectancy), can be continuously re-coated so no waste material has to go to landfills, can be tinted for various colors, and bonds well to AAC. It is simply applied by spray or roller.

FIG. 4A, section B, as a preferred system, incorporates a polyester/nylon mesh 42, having alternate sections of a tight mesh 43 and a loose mesh, and is placed over the AAC panels in the direction of the ridge down to the eaves. Next, an elastomeric composition 41 is applied to the mesh, and, as a result of the porosity of the loose mesh, the elastomeric composition goes through the loose mesh and adheres to the AAC panels. However, the elastomeric material will not go through the tight mesh 43 such that an air channel 47 is created between the tight mesh 43 and the AAC panels 40. Further, another coat of the elastomeric material 41 may be applied for extra wear resistance. The respective air channels 47 allow moisture in the AAC panels to escape, i.e. breathe. Additionally, the air channels 47 also function as air is drawn up through the channels from the eaves end of roof to the top ridge vent 48 by use of naturally occurring temperature and wind where it may be vented 48 to the atmosphere.

The integrated gutter system of this invention uses industry standard AAC roof panels with a modification in steel reinforcing. Since gutters (FIGS. 4A and 4B) 44, may be routed out of the roof panel 40, the top rows of embedded reinforcing rods 52, see FIG. 4B, extend short of the edge similar to bond beam panels (FIG. 5B). There is no need for all the structural reinforcing at the gutter location as AAC is strong enough by itself An angled routed groove 44 may be added to the AAC panels to transmit moisture out of the roof assembly and act as an integrated gutter system to gutter box 46 hereof. No prior art of cementitious materials with integrated gutter systems employ a gravity driven water removal method. All prior art relies on inferior water pressure method as subsequent water forces previous water toward down spout box and off the roof. The prior art's use of water pressure has negative results of residual moisture remaining in trough which eventually causes water damage due to debris build up and/or freezing. Invention's down spout box 46, FIG. 4D, disperses moisture out and away from habitat by curved wall and wide slot at base. The interior ridges and various platform heights of curved wall near slot break up the mass of water into smaller droplets so as it is propelled out of box large volumes of water do not overburden any one area too much.

Finally, the facia water deflection system 45 is one and the same material as the roofing and is one continuous niece of roofing material, specifically shaped to have reversing angles with a series of sharp angles so it is impossible for water coming off the roof to run down its face, but rather gravity pulls water off its face at several different places, which not only deflects water away from house but also breaks water down into smaller droplets so it does not damage landscaping beneath. Therefore, facia design is not just a cosmetic architectural feature, it is an unique functioning aspect of the roofs waterproofing and moisture removal system much different than existing plumb facia boards and molding which recess with angles but not reversing angles. An integral functioning process advantage of the finished ends of the roof panels lies in its water deflection that is multifaceted. The reversed angle routed end makes it impossible for excess moisture from the roof to run down face of the panel end/roof facia. This overcomes two failures of the prior art, namely: 1) moisture carrying naturally occurring debris running down vertical facia causes unsightly streaks; and 2) moisture running down facia is easily blown back toward habitat. By means of the instant invention, the need for additional labor and material of drip edge is avoided, while adding unique architectural enhancement to the habitat.

Therefore, the present invention's roof panel design and process of moisture removal system is comprised of a single cementitious material identical to the roof and is actually roof material itself and thus an indivisible component of roof consisting of two distinct components: 1) a downwardly angled trough 44 which feeds moisture to a down spout or the down spout box of this invention; and 2) a facia 45 with square edges and upward, reverse angle pitches having a multi faced formed edge of cementitious roof. This roof system is then coated with either of the two water-proofing materials 47, or 41. Both moisture removal attributes are part of the present invention's roofing system and work in conjunction with each other as one moisture removal system.

Doors are possible with AAC, as seen in FIG. 10, so that even four hour rated fire wall 204 may be possible with an operating door 100 which is composed of AAC. The door face can have all types of architectural or decorative effects as a standard wood door. The wall is composed of standard wall blocks 200A, 200B but uses casing blocks 203 having custom fire thwarting design and latch system 101. The door can be held in place by special heat resistant piano type hinge 103 or the internal hinge 104 hereof, which has special sliding hinge pin so all mechanical parts are protected within fire proof AAC.

Now that the individual embodiments of materials and structure of habitat are understood, what needs to be explained is the preferred fasteners and tools of this inventive system. The auger screw (FIGS. 7–7C) is a preferred method of securing, not just to fasten, but to actually bond AAC together. The screw 70 acts as an auger screw and gets its name from the fact it provides more structural advantages than standard rebar but does so with the ease of a screw, especially as screw engages any steel reinforcing in the panels and elsewhere. As noted above, a fastener 70 can be used to secure a roof beam 30 and/or panel 40 to the crown block 207.

One difficulty is that prior art fasteners, such as the Helifix, can work free over time without mortar holding pieces fast, consequently if mortar in joints ever failed then system is in jeopardy. Also, the Helifix is inadequate in size to secure large, heavy pieces of cementitious material, and due to need for cement to assist bonding, simply increasing size does not solve its design inadequacies. To improve the fastening capabilities of AAC materials, such as the roof beam to the crown block, a new and unique fastener had to be developed.

Though different, U.S. Pat. No. 5,143,498, to Wiftman, and granted Sep. 1, 1992, teaches a rubber roofing material fastening device that includes an optional liquid sealer to facilitate the process of affixing roof items to the upper surface of a roof The fastening device has a longitudinally extending centrally located chamber that is coaxially aligned with the longitudinal central axis of the fastening device. The chamber has a plurality of laterally disposed openings that extend from the chamber to the outer surface of the fastening device. The chamber is adapted to receive a liquid sealant at an opening in the upper surface and disperse same through such lateral openings. The exterior surface of the screw shaft is formed with screw threads having a dual set of helically wound, threaded members. The external, most radially outer portions of the threads are grooved with serrated teeth to enhance the holding power of the fastening device.

Figure 7C:
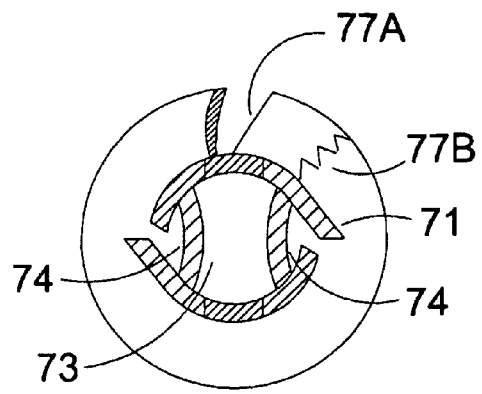
Figure 7B:
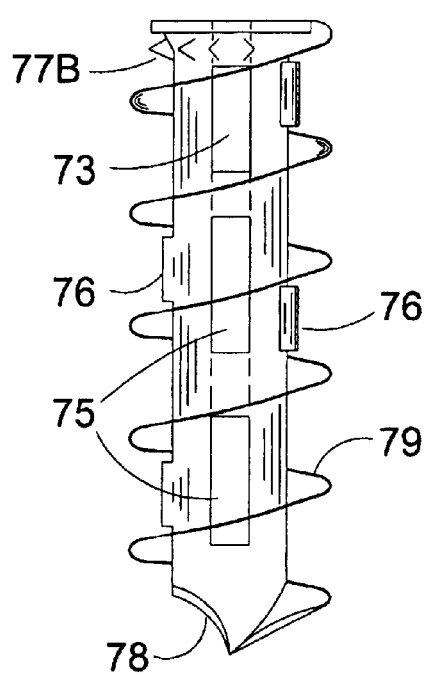
Figure 7D:
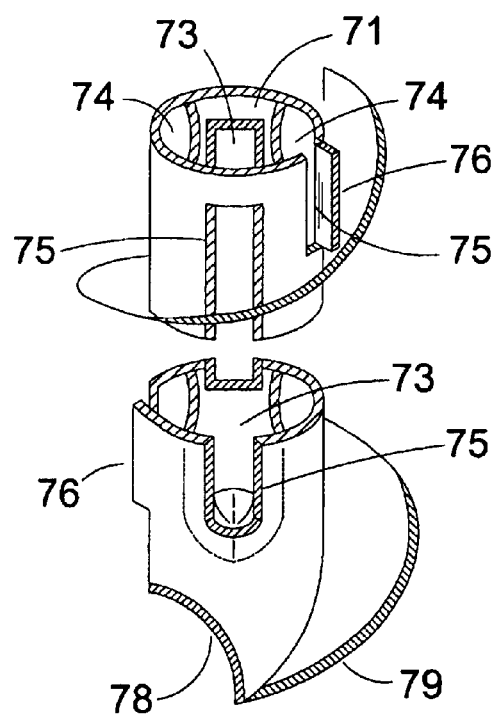

The screw fastener member 70, FIGS. 7–7C, of this invention is comprised of a solid core 71, preferably "hour glass" in shape, within an annular wall 72 to define three elongated cavities, one passing through the center to each side, and two opposite each other on outer sides separated by the center cavity. The three elongated cavities create two functioning processes with the two cavities opposite each other performing the same process, namely, the center cavity is a mortar chamber 73 and the side cavities are dust chambers 74. Along the annular wall there are provided plural openings 75 in communication with the mortar chambers. Additionally, there are provided plural openings on the annular wall and in pointed end 78 in communication with the dust chambers with at least one cut-out window having a scraper blade 76, which is a portion of the cut-out of the wall extending tangentially from the annular wall 72. In operation, the dust chambers 74 captures AAC dust created by scraper 76, as well as through opening in pointed end 78. The scrapers 76 serve two functions: 1) to enlarge hole area around shaft 72 so that an air space is created between the AAC and shaft 72, which space will be filled with mortar flowing out of mortar chamber 73 via opening 75; and, 2) remove from the enlarged hole all lose AAC dust so that mortar flowing out of mortar chamber 73 has a good surface for bonding. The head portion 77 removably receiving a square head power screw driver as an air ratchet, which square opening is an opening through to the mortar chamber and through which mortar is poured into cavity after driver bit has placed screw member 70.

Additionally, at head 77 is the termination of helical thread arrangement 79 at an open slot 77A so that the entire screw can be counter sunk into AAC. Finally, exterior of the shank 72, from the head portion 77 to the opening, is pointed at one end 78, and includes said large angled helical screw arrangement 79 with wide threads. It will be seen that this is in sharp contrast to the very shallow angle and narrowness of the helical threads of a conventional screw. The design of thread of this invention is unique to its application for maximum hold with least negative torque influence thereon, and damage to the AAC. The result of the invention is a screw which has all the advantages, and more, of rebar but can be installed in one easy step directly through numerous pieces of AAC and secures in place each piece of AAC, regardless of where AAC is located, i.e., slope, angle, etc. which before this invention was not possible.

Alternative fastening inventions are the hollow bar (FIG. 7AA) and flange bar (FIG. 7AAA). The hollow bar has a dust chamber 74 within annular wall 72 with advantage of provided plural cut-out windows having a scraper blade 76, which is a portion of the cut-out of the wall extending tangentially from the annular wall 72. In operation, the dust chambers 74 captures AAC dust created by scraper 76, as well as through opening in pointed end 78. The scrapers 76 serve two functions: 1) to enlarge hole area around shaft 72 so that an air space is created between the AAC and shaft 72, which space will be filled with mortar being poured into gap around exterior of shaft at entrance to hole; and, 2) remove from the enlarged hole all lose AAC dust so that mortar has a good surface for bonding. The design of thread of this invention is unique to its application for maximum hold with least negative torque influence thereon, and damage to the AAC and the gaps 705 in thread are for purpose of allowing mortar poured into opening created by flanges to flow continuously down between screw wall and AAC and around threads sections. The result of the invention is a screw which has all the advantages, and more, of "R" screw, but can be manufactured for less cost and be custom cut at site to variable lengths as thread gap 705 and opening pattern repeats itself.

The crimping tool for cutting and forming hollow bar has multiple blades which form functions of: 1) crimping tube which helps hollow bar enter AAC and grind it, 2) cut it, and 3) form teeth out of cut end for two functions: 3A) on end entering AAC, teeth cut and grind up AAC 706 and feed AAC dust up into dust chamber 74, and, 3B) end used for driving hollow bar into AAC works as would a normal head on a screw would, as it designed to receive a drill bit and teeth have gaps which can receive a Phillips head screw driver bit and allow hollow bar to be counter sunk. Alternately, the bit fits over the end and tightens onto the tube.

The flange bar is similar to industry rebar except invention is modified by unique flanges 701 which are positioned and angled 705 to act like screw threads and design of being wider 704 and thicker 703 at bar and then narrowing with receding leading edge 704 and getting thinner towards end 703 provides service of keeping bar centered in hole by resistance of flanges against wall as it is inserted and as flanges bite into walls they bind cementitious pieces together and prevent shifting and/or movement while mortar is added around bar it sets up. It has advantages of inexpensive to manufacture and length being custom cut from long bar on site, but has disadvantage of it requiring pre drilling a hole. The fastener 75, FIG. 7E, is a screw for installing AAC panels onto a wood or steel rafter system, where the fastener features a pair of concentric shaft portions, with the upper portion having broad helical threads, and lower portion with much smaller helical threads. It has the advantage of using these multipurpose threads which are designed for surface area contact, where the tight or lower threads 725 serve the purpose of starting the fastener into the AAC and then properly imbedding into the wood or steel rafters, FIG. 7F. The upper or loose threads 79 properly hold the AAC without stripping or damaging the AAC, as well as to prevent the fastener from going too far into the AAC, as the axial length of the threads 79 correspond to the thickness of the AAC panels 40. The fastener has features of AAC gougers 77B and countersink head 77A, that facilitates environmentally friendly one coat coverage of roofing material 47, as taught by the present invention, and replaces conventional heavy roofing shingles, etc., to make this invention possible and practical.

Another fastening device, the nail screw 80, shown in partial views in FIGS. 8–8D, has particular utility in securing smaller items to a cementitious material, such as AAC. It can be comprised of a strong, hard plastic instead of steel. It is unique by its ability to be driven into the AAC with a hammer, while further having the ability to be withdrawn by means of a rotational hand tool, i.e., hand or powered screw driver 81 (FIG. 8C). This device overcomes problems of prior art in that it will not easily work free over time and yet is removable using the correct tool without damage the item to be secured and/or AAC. The fastener member 80 hereof is comprised of a triangular threaded 82 elongated shank 82, with very low number of revolutions around shank and is pointed at one end 85. The pointed end has openings 83 that aid the "N" screw to grip AAC by gathering and compacting AAC dust that presses against AAC wall. The "N" screw is topped at the opposite end by a head portion, where the head portion includes prongs 84 for piercing AAC to provide additional holding of the screw member 80 in place. On the top side of head is a slot 81 for removably receiving a screw driver head, as known in the art, to remove the screw 80 from location. The design allows for unique multiple applications in the same location that no other fastener with such simple construction provides in AAC. Additionally, the elongated shank can be hollow 85 and a standard finish nail 86 be driven through which explodes the tip 87 and further anchors hammer nail. To remove the hammer nail, one first applies a needle nose pliers to remove the finish set nail 86 and then a screw driver and the screw's threads supply enough torque for AAC wall to force exploded tip to re-close and remove screw 80 from the AAC.

Figure 11E:
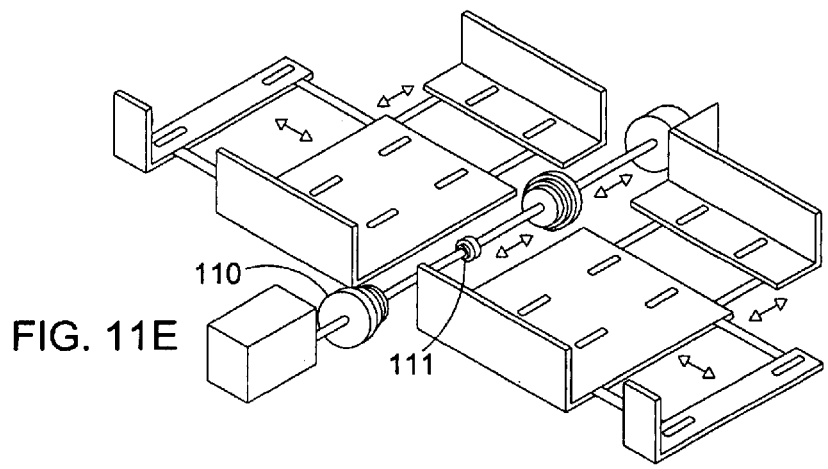
FIGS. 11A through 11E are various views of routing tools, such as a hand held utility chase cutting tool.
Figure 11B:
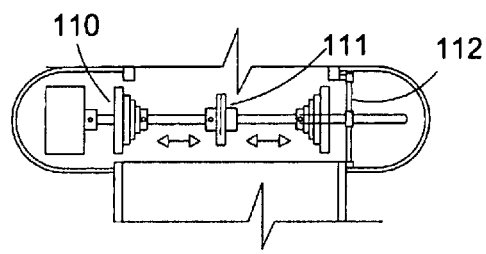
Figure 11C:
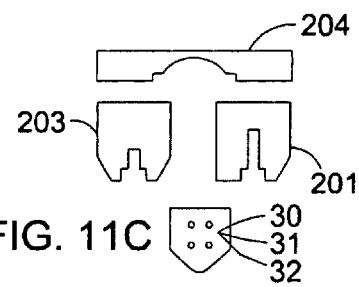

Turning further to the tools of FIGS. 11–11E, a table 90 (FIG. 11A) is of a block and panel architectural fabricator. The table 90 has router bits 110, 111, 112 with the potential for variable positions, and ability for different bits 110, 112 on each router cutting simultaneously so each side of block, panel and/or beam has desired architectural features, including utility chase 111 as an example in FIG. 11C, reference numerals 201, 203 and beams 30, 31, 32. FIG. 11D is a partial view of a hand held version cutting a casing block 203. The most unique aspect of the tools hereof is the ability through combined use of the tools and template system of FIG. 16 to fabricate finished openings for windows and doors in a solid AAC wall.

Figure 11A:
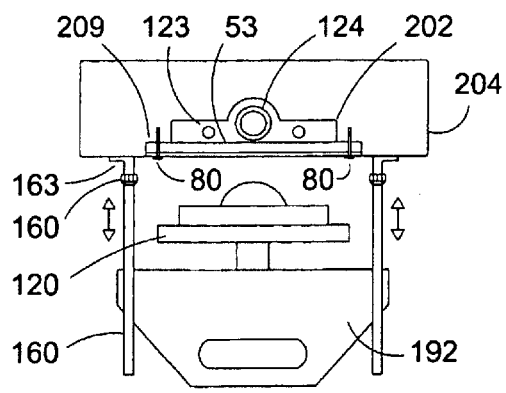

A tool used for cutting utility chases into erected walls is illustrated in FIG. 11A, which is a partial top view of a hand held utility chase cutter 192 with the bit 120 which simultaneously cuts a notch (FIG. 2BB) for sheetrock 209 and the chase 203. It uses the template guide system 160, 163 hereof (FIG. 11A) as does most of the hand held cutting tools. FIG. 11A shows utility chase 202 with sheetrock 209 installed using screws 80, covering water supply 123 and waste pipes 124. The utility chase cutter can be used for vertical as well as horizontal runs. Since the bit protrudes beyond the face of the interior wall, it is able to cut down behind the base block and up behind the crown block. Then a standard drill can cut holes for utilities through floor panel. The chase is covered using a single cut to size a piece of sheetrock. The tools hereof have the capabilities of special dust collecting systems.

There is very limited waste product of AAC according to the preferred practice of this invention, but what waste there is can be easily handled by systems known in the art. Such systems can crush waste cementitious pieces into dust, so they do not have to be taken to landfills, which means habitats manufactured by the instant invention can be constructed with little or no waste AAC from the site having to go to a landfill, thereby lessening construction costs and providing an environmentally friendly practice. The resulting dust may then be used as fertilizer for grass, etc.

As blocks of AAC are set in place, excess mortar can be forced out beyond the wall face. To solve this problem FIG. 15 shows a partial perspective of present invention joint finisher 150. The joint finisher has a unique roller 152 which serves several useful function namely, keeps blade 151 at optimal angle for removing excess AAC mortar from block face at joints and roller smoothes out any residual trace amounts of mortar, and the spring pressured cleaning blade 153 removes AAC which may accumulate on the roller, so that now one movement replaces prior art's several tools and motions.

The hand held finishing tool shown (FIG. 11D) and may be used with a template guide so that an architecturally finished opening results where there was once just a wall. The window is simply slipped in and caulked and/or finish nailed. No additional wood trim or casing is required. The outlet and switch openings, beam notches, etc. require a different type of template guide having prongs. The guiding arms may be kept perpendicular by level bubble on support arm 160. In difficult positions, such as a corner notch, an angled template guide is used and, as the rotor zip type tool goes around a guide, a chunk of AAC is removed which allows the beam to seat into wall and be finished with mortar and screw.

Figure 12A:
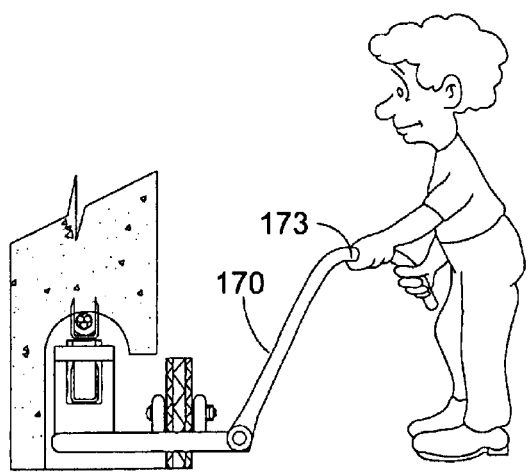
FIGS. 12A through 12C are various views of a tool for inserting wires into utility channel and fastening in place.
Figure 12B:
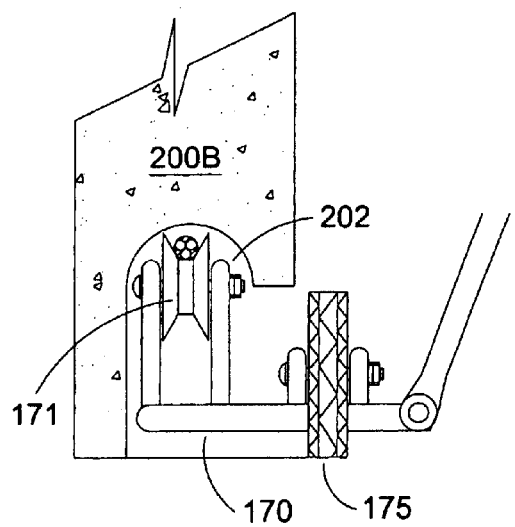
Figure 12C:
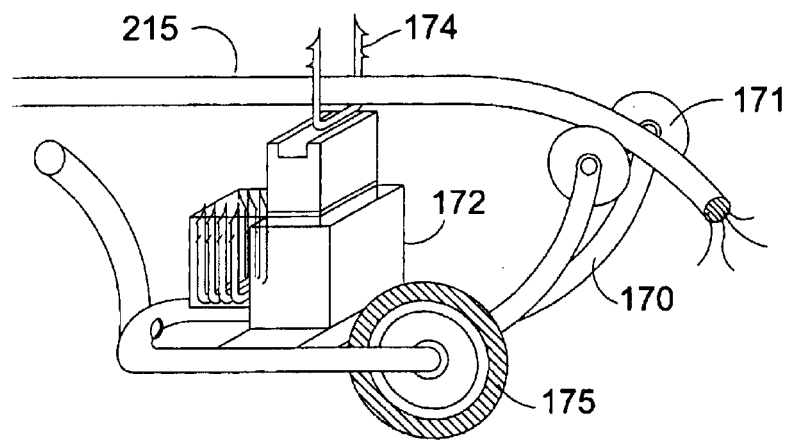

For easing an electrician's job of installing electrical wire (FIG. 12A) into a utility channel, the wire inserting tool 170 (FIG. 12A) has a long, specifically angled bar 170 with ability to slip into utility channel 202 and wheel 175 enables installer to simply walk along while the wire feeding wheel 171 by design aligns and lifts wire onto roof of channel where staple fastener 172 shoots a unique staple 174 which does not easily pull out around wire and into the AAC.

Figure 13D:
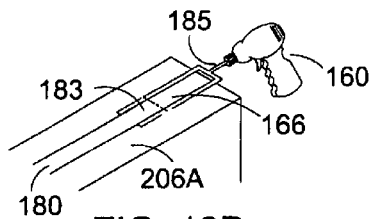
FIG. 13D shows a perspective view of a deep socket, large tubular bit being used to create a void in a top beam.
Figure 13B:
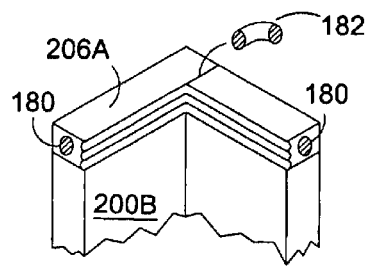
FIGS. 13A through 13C are various views of a duct system for manufacturing structures according to the invention hereof, including an architecturally finished seam system.
Figure 13E:
FIG. 13E shows a perspective view of the deep socket, large tubular bit.
Figure 13C:
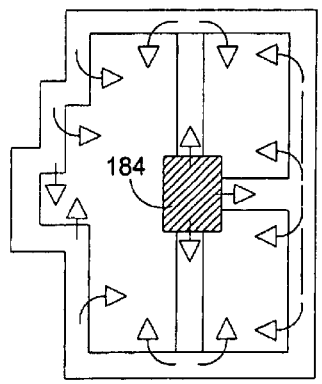
Figure 13A:
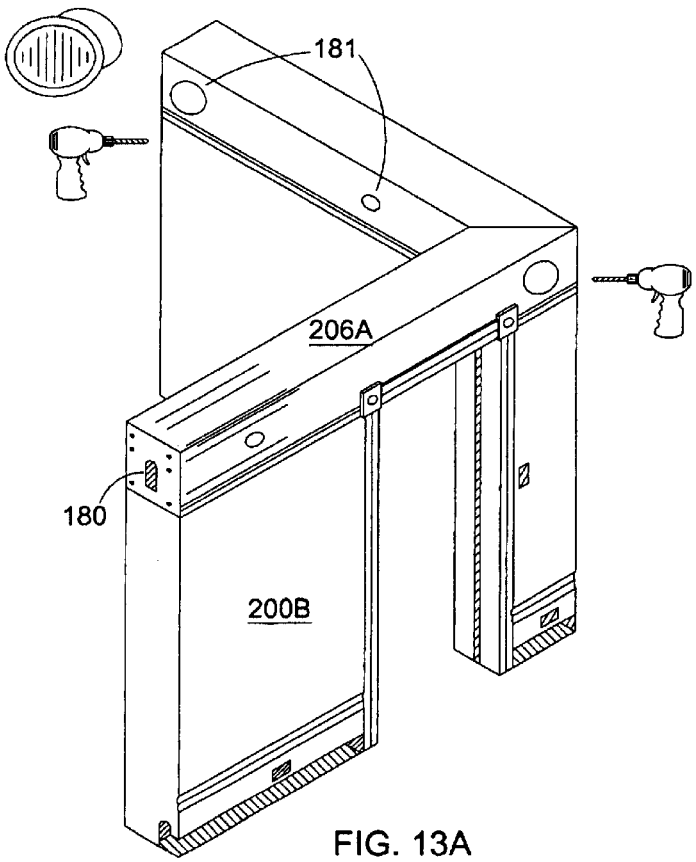

The internal air duct system 180 of this invention, see FIGS. 13A–13B, can be housed in the top beam 206A and structural beam system. A PVC type pipe may be placed within the cementitious material (AAC) which benefits the AAC by reducing its weight and simultaneously reinforcing it, and further the AAC is benefits the air duct by insulating it, hiding the duct system to enable easy access for vents 181. The vents 181 can have various sizes for openings as engineered for facilitating desired air flow, and regulated by vent opening size and proximity to air return vents. The system can be located at a centralized location and initial service ducts run through a chase 184 shared by other main utilities, and then hooked up to the internal duct system. The duct corners 182, as seen in FIG. 13B, are installed by deep socket, large tubular bit 185 which goes around exterior of air duct 180, and creates a void 183. The duct is then cut back at a required depth 166 to align with the duct in the adjoining piece, and the AAC is cleared so that the corner coupling 182 slips into the void and over the duct in the top beam 206A, and likewise in second top beam 206A, thereby creating a continuous duct system with rounded corners. A manufacturing process of creating void around the duct is to have an inflatable sleeve 186 (FIG. 2K) placed on the pipe while in the mold before slurry is introduced. After the mold is removed, the sleeve is deflated and removed. At the site, by this embodiment, the AAC is simply cut back as required and duct's corner coupling 182 slipped on.

There is limited waste product with the AAC according to the preferred practice of this invention, but what waste there is can be easily handled by the machine 140 that can crush waste cementitious pieces 142 into dust 141, so they do not have to be taken to landfills. This means habitats manufactured by the instant invention can be constructed with little or no waste AAC from the site having to go to a landfill, thereby lessening construction costs and providing an environmentally friendly practice. The resulting dust may then be used as fertilizer 144 for grass, trees, etc.

As blocks of AAC are set in place, excess mortar can be forced out beyond the wall face. To solve this problem, FIGS. 15 and 15A show a joint finisher 150 according to the invention. The joint finisher 150 has a unique roller 152 which serves several useful functions, namely, keeps blade 151 at an optional angle for removing excess AAC mortar from the block face at joints and the roller smoothes out any residual trace amounts of mortar, while the spring pressured cleaning blade 153 removes AAC which may accumulate on the roller. The result, one tool replaces the prior art's tools and motions.

Figure 11D:
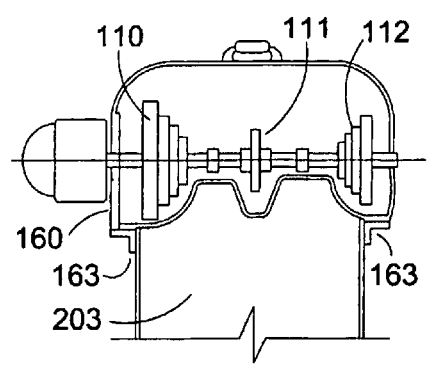

The hand held finishing tool shown in FIG. 11D may be used with a template guide so that an architecturally finished opening results where there was once a wall. The window is simply slipped in and caulked and/or finished nailed. No additional wood trim or casing is required. The outlet and switch openings, beam notches, etc. require a different type of template guide having prongs. The guiding arms may be kept perpendicular by level bubble on the support arm 160. In difficult positions, such as a corner notch, an angled template is used and, as the rotor zip type tool goes around a guide, a chunk of AAC is removed which allows the beam to seat into the wall and be finished with mortar and screw.

It is recognized that changes, variations and modifications may be made to the method of this invention, and to the securing device, particularly by those skilled in the art, without departing from the spirit and scope thereof Accordingly, no limitation is intended to be imposed thereon except as set forth in the accompanying claims.

I claim:

1. A method for constructing multi-sided, habitable dwellings principally from pre-cut blocks of a cementitious material by building up from a foundation to form a wall having a door opening, said method comprising:

cementing a first course of blocks onto said foundation to form a wall section, wherein each of said first course blocks includes at least a longitudinal slot, with the longitudinal slots of adjacent first course blocks being aligned, said first course comprising vertically oriented first course blocks of a predetermined size so that the height of each of said first course blocks approximately equals the height of the door opening, with a horizontal plane being formed along the top of said wall section;

adding a horizontally aligned course of beams on top of said first course, wherein a planar top surface is formed;

adding a structural component which is architecturally finished on three sides bordering the door opening; and adding a stair system to join multiple living levels, wherein said stair system is comprised of steps of cementitious material and two support brackets, and wherein each of said steps has a slot in each end, the orientation of which slot corresponding to the desired pitch of the stairs, with the slots of adjacent steps being aligned when said steps are installed on said brackets; and providing an uppermost course of blocks to support a roof, said uppermost course having a top angled planar surface defining a roof pitch for securing a roof system thereto.

2. A structure produced according to the method of claim 1.

3. A method for constructing multi-sided, habitable dwellings principally from pre-cut blocks of a cementitious material by building up from a foundation to form a wall having a door opening, said method comprising:

cementing a first course of blocks onto said foundation to form a wall section, wherein each of said first course blocks includes at least a longitudinal slot, with the longitudinal slots of adjacent first course blocks being aligned, said first course comprising vertically oriented first course blocks of predetermined size so that the height of each of said first course blocks approximately equals the height of the door opening, with a horizontal plane being formed along the top of said wall section;

adding a horizontally aligned course of beams on top of said first course, wherein a planar top surface is provided;

adding a structural component which is architecturally finished on three sides bordering said door opening;

overlaying and spanning said course of beams with a floor comprising floor panels, each of which floor panels having a groove manufactured into said floor panel, with the grooves of adjacent panels being aligned, whereby placing rebar and mortar into said grooves provides a bond/ring beam which is integrated into said floor;

connecting plural roof beams to one another so that a structural support system results there from, each of said roof beams having corresponding notched ends which match, and a longitudinal cavity into which reinforcing cement can be placed, the longitudinal cavity of each roof beam aligning with another roof beam's longitudinal cavity so that reinforcing and cement inserted therein flows through individual roof beams, thereby creating a monolithic roof beam system; and applying plural roof panels to said roof beam system to create a roof having a ridge, said applying step comprising: using a fastening device which requires no pre-drilling nor the presence of a pre-manufactured void to allow an adhesive to be inserted into a fastening cavity formed by said fastening device, and which holds said plural roof panels in a desired position while said adhesive sets.

4. The method according to claim 3, wherein said applying plural roof panels step further comprises:

applying cementitious roof panels, each of said cementitious roof panels having a panel edge comprising a facia water deflection system having a chamfer with at least one sharply reversing and upwardly angled groove which aligns with a similar groove in other cementitious roof panels and runs parallel to the length of said panel edge, each of said cementitious roof panel having reinforcing that stops short of said panel edge, which resultant area void of reinforcing allows a trough to be cut in said roof adjacent to said panel edge without interference.

5. The method according to claim 4, further comprising:

applying a roofing material to said roof, said trough running at a downward angle, such that trough segments cut in adjacent said roof panels are aligned so that water flows by force of gravity through said trough.

6. The method according to claim 5, wherein said applying a roofing material step further comprises:

overlaying said roof panels with a polyester/nylon mesh fabric featuring alternating sections of a tight mesh and a loose mesh.

7. The method according to claim 6, wherein said applying a roofing material step further comprises:

applying an elastomeric material to said mesh fabric, in such a way that said elastomeric material penetrates only said loose mesh sections to bond to said roof panels, such that air channels are created between said tight mesh sections and said roof panels, which air channels allow moisture in said roof panels to escape, said air channels running unobstructed from a lower starting position to near said ridge where said channels discharge said moisture.

8. A structure produced according to the method of claim 3.

9. A structure produced according to the method of claim 4.

10. A structure produced according to the method of claim 5.

11. A structure produced according to the method of claim 6.

12. A structure produced according to the method of claim 7.

13. A method for manufacturing a structure of a cementitious material, said method comprising:

placing a first course of wall blocks to form a wall and an opening in said wall, wherein at least some of said first course blocks are curved blocks; and placing a course of block beams on top of said first course;

wherein said curved blocks are manufactured while said cementitious material is in an uncured state, using a computer controlled mechanism for directing cutting wires through said uncured cementitious material in a pattern, thereby producing a high yield and little waste, and thereafter curing said uncured cementitious material.

14. A method for manufacturing a structure of a cementitious material, said method comprising:
   placing a first course of wall blocks to form a wall and an opening in said wall;
   placing a course of block beams on top of said first course; and
   placing roof beams having elongated voids on said block beams;
   wherein said roof beams having elongated voids are manufactured by inserting into a block of uncured cementitious material a conical implement having a smaller end and a larger end in such a way that said smaller end is embedded in said material and said larger end extends outside said material so that said implement can be easily removed.

15. The method of claim 14, further comprising:
   joining and simultaneously reinforcing two of said roof beams having elongated voids in one step by adding a settable liquid to said elongated cavity in such a manner that said settable liquid flows bonds to said material and sets, thereby producing one monolithic, structurally reinforced piece from plural pieces of material.

16. The method according to claim 4, further comprising:
   applying a curable, liquid base material on said roof panels, wherein said base material bonds to said cementitious roof panels, and when cured, is waterproof, is durable, is chemical resistant, has a high modulus of elasticity, has a high value of water vapor permeability, and is tintable.

17. A structure produced according to the method of claim 16.

18. A method for constructing multi-sided, habitable dwellings principally from pre-cut blocks of a cementitious material by building up from a foundation to form a wall having a door opening, said method comprising:
   cementing a first course of blocks onto said foundation to form a wall section, wherein each of said first course blocks includes at least a longitudinal slot, with the longitudinal slots of adjacent first course blocks being aligned, said first course comprising vertically oriented first course blocks of a predetermined size so that the height of each of said first course blocks is approximately equal to the height of the door opening, with a horizontal plane being formed along the top of said wall section;
   adding a horizontally aligned course of beams on top of said first course, wherein a planar top surface is formed;
   adding a structural component which is architecturally finished on three sides bordering said door opening; and
   inserting a device for fastening wiring into said longitudinal slot, said longitudinal slot having a narrow opening near floor level and then extending up into said first course of blocks so that a portion of the longitudinal slot is hidden from view, said device comprising a long handle with shorter curved piece turned upward, and at end of said upward curved piece, a mechanism for holding wire and simultaneously feeding it to a desired location.

19. A method for manufacturing a structure of a cementitious material, said method comprising:
   placing a first course of wall blocks or a first course and a second course to form a wall and an opening in said wall;
   placing a course of block beams on top of said first course or on top of said second course; and
   constructing a stair system, said stair system comprising a plurality of steps and at least two support brackets, each of said steps having two ends and each of said ends having a slot, the slots being configured so as to allow said steps to be slidably mounted on said support brackets in a level orientation.

20. A structure produced according to the method of claim 19.

21. A method for manufacturing a structure of a cementitious material, said method comprising:
   placing a first course of wall blocks to form a wall and an opening in said wall;
   placing a first course of block beams on top of said first course;
   optionally, placing a floor, a second course of wall blocks and a second course of block beams on top of said first course of block beams;
   placing a course of crown blocks on said first course of block beams or said second course of block beams;
   placing a roof beam system on said course of crown blocks; and
   placing a plurality of roof panels on said roof beam system to create a roof having a ridge using a fastening device that requires no pre-drilling to allow an adhesive to be inserted into a fastening cavity formed by said fastening device and that holds said roof panels in place while said adhesive sets.

22. The method of claim 21 further wherein said placing a plurality of roof panels step further comprises:
   placing a plurality of roof panels having edges comprising a facia water deflection system on said roof beam system, said facia water deflection system comprising a chamfer having at least one sharply reversing and upwardly angled groove.

23. The method of claim 22 further comprising:
   cutting a trough in said roof panels adjacent to said edges, said trough running at a downward angle so that water entering said trough flows by force of gravity through said trough; and
   applying a roofing material to said roof.

24. The method of claim 23 wherein said applying a roofing material step further comprises:
   overlaying said roof panels with a mesh fabric having alternating sections of a tight mesh and a loose mesh.

25. The method of claim 24 wherein said applying a roofing material step further comprises:
   applying an elastomeric material to said mesh fabric to create channels that run from a lower starting position to near said ridge.

26. The method of claim 21 further comprising:
   applying a curable material to said roof panels.

27. A structure produced according to the method of claim 21.

28. A structure produced according to the method of claim 22.

29. A structure produced according to the method of claim 23.

30. A structure produced according to the method of claim 24.

31. A structure produced according to the method of claim 25.

32. A structure produced according to the method of claim 26.

33. A method for manufacturing a structure of a cementitious material, said method comprising:

placing a first course of wall blocks to form a wall and a door opening in said wall, wherein each of said first course blocks includes at least a longitudinal slot, with the longitudinal slots of adjacent first course blocks being aligned and extending up into said first course of blocks;

placing a structural component within said door opening, said structural component bordering three sides of said door opening and having a utility chase therein that is in communication with said longitudinal slots;

placing a course of block beams on top of said first course; and inserting a device for fastening wiring into said longitudinal slot, said device comprising a handle and a mechanism for feeding a wire into said longitudinal slot and fastening it to said first course blocks.

34. A structure of a cementitious material, said structure comprising:

a first course of wall blocks or a first course and a second course that form a wall and an opening in said wall;

a course of block beams that is placed on top of said first course or on top of said second course; and a stair system, said stair system comprising a plurality of steps and at least two support brackets, each of said steps having two ends and each of said ends having a slot, the slots being configured so as to allow said steps to be slidably mounted on said support brackets in a level orientation.

35. A structure of a cementitious material, said structure comprising:

a first course of wall blocks that form a wall and an opening in said wall;

a first course of block beams that is placed on top of said first course;

optionally, a floor, a second course of wall blocks and a second course of block beams that are placed on top of said first course of block beams;

a course of crown blocks that is placed on said first course of block beams or said second course of block beams;

a roof beam system that is placed on said course of crown blocks; and a plurality of roof panels that are placed on said roof beam system to create a roof having a ridge using a fastening device that requires no pre-drilling to allow an adhesive to be inserted into a fastening cavity formed by said fastening device and that holds said roof panels in place while said adhesive sets.

36. The structure of claim 35 wherein:

said plurality of roof panels have edges comprising a facia water deflection system that is placed on said roof beam system, said facia water deflection system comprising a chamfer having at least one sharply reversing and upwardly angled groove.

37. The structure of claim 36 further comprising:

a roofing material that is applied to said roof;

wherein said roof panels are provided with a trough adjacent to said edges, said trough running at a downward angle so that water entering said trough flows by force of gravity through said trough.

38. The structure of claim 35 wherein:

said roof panels are overlaid with a mesh fabric having alternating sections of a tight mesh and a loose mesh.

39. The structure of claim 38 wherein:

an elastomeric material is applied to said mesh fabric to create channels that run from a lower starting position to near said ridge.

40. A structure of a cementitious material, said structure comprising:

a first course of wall blocks that forms a wall having a base and two outer surfaces along its length and a door opening in said wall, wherein each of said first course blocks includes at least a longitudinal slot, said longitudinal slot being an opening in one of said outer surfaces along said base and extending up into said first course of blocks, with the longitudinal slots of adjacent first course blocks being aligned; and a cementitious structural component that is placed within said door opening, said cementitious structural component bordering three sides of said door opening and having a utility chase therein that is in communication with said longitudinal slots.

* * * * *